(12) United States Patent
Lin et al.

(10) Patent No.: US 12,322,111 B2
(45) Date of Patent: Jun. 3, 2025

(54) IMAGE SEGMENTATION METHOD, DEVICE, EQUIPMENT AND STORAGE MEDIUM

(71) Applicant: United Imaging Research Institute of Innovative Medical Equipment, Guangdong (CN)

(72) Inventors: Fengyu Lin, Shenzhen (CN); Yinglong Liu, Shenzhen (CN); Zhuoli Zhuang, Shenzhen (CN); Tingting Huang, Shenzhen (CN)

(73) Assignee: UNITED IMAGING RESEARCH INSTITUTE OF INNOVATIVE MEDICAL EQUIPMENT, Shenzhen (CN)

( * ) Notice: Subject to any disclaimer, the term of this patent is extended or adjusted under 35 U.S.C. 154(b) by 434 days.

(21) Appl. No.: 17/559,473

(22) Filed: Dec. 22, 2021

(65) Prior Publication Data
US 2022/0207742 A1   Jun. 30, 2022

(30) Foreign Application Priority Data

Dec. 30, 2020   (CN) .......................... 202011613802.1
Dec. 30, 2020   (CN) .......................... 202011613841.1
(Continued)

(51) Int. Cl.
*G06T 7/11*        (2017.01)
*G06N 3/045*       (2023.01)
(Continued)

(52) U.S. Cl.
CPC ............... *G06T 7/11* (2017.01); *G06N 3/045* (2023.01); *G06T 3/4046* (2013.01); *G06T 7/60* (2013.01);
(Continued)

(58) Field of Classification Search
None
See application file for complete search history.

(56) References Cited

U.S. PATENT DOCUMENTS 10,140,544 B1   11/2018   Tianyi et al.
10,726,356 B1   7/2020   Zarandioon et al.
(Continued)

FOREIGN PATENT DOCUMENTS

CN   107530881 A   1/2018
CN   108460411 A   8/2018
(Continued)

OTHER PUBLICATIONS

Singh et al., "3D Deep Learning on Medical Images: A Review." Sensors 2020, 20, 5097; doi:10.3390/s20185097 (Year: 2020).*
(Continued)

*Primary Examiner* — Soo Shin
(74) *Attorney, Agent, or Firm* — GREENBLUM & BERNSTEIN, P.L.C.

(57) ABSTRACT

Disclosed is an image segmentation method, including: obtaining an original image to be segmented; preprocessing the original image to be segmented, comprising, by taking each candidate sampling start point as an actual sampling start point, down-sampling the original image to be segmented, and obtaining down-sampled images corresponding to each candidate sampling start point; and inputting preprocessed images into a trained segmentation model to obtain an object segmented image corresponding to the original image.

17 Claims, 14 Drawing Sheets

(30) Foreign Application Priority Data

Dec. 31, 2020 (CN) .................. 202011626216.0
Dec. 31, 2020 (CN) .................. 202011643646.3

(51) Int. Cl.
| | | |
|---|---|---|
| G06T 3/4046 | (2024.01) | |
| G06T 7/60 | (2017.01) | |
| G06T 7/73 | (2017.01) | |
| G06V 10/10 | (2022.01) | |
| G06V 10/25 | (2022.01) | |
| G06V 10/26 | (2022.01) | |
| G06V 10/44 | (2022.01) | |
| G06V 10/766 | (2022.01) | |
| G06V 10/77 | (2022.01) | |
| G06V 10/774 | (2022.01) | |
| G06V 10/776 | (2022.01) | |
| G06V 10/82 | (2022.01) | |

(52) U.S. Cl.
CPC .............. *G06T 7/73* (2017.01); *G06V 10/16* (2022.01); *G06V 10/25* (2022.01); *G06V 10/26* (2022.01); *G06V 10/44* (2022.01); *G06V 10/766* (2022.01); *G06V 10/7715* (2022.01); *G06V 10/7747* (2022.01); *G06V 10/776* (2022.01); *G06V 10/82* (2022.01); G06T 2200/04 (2013.01); G06T 2207/20021 (2013.01); G06T 2207/20081 (2013.01); G06T 2207/20084 (2013.01)

(56) References Cited

U.S. PATENT DOCUMENTS

| | | | | |
|---|---|---|---|---|
| 2010/0268225 | A1 | 10/2010 | Coe et al. | |
| 2014/0079297 | A1* | 3/2014 | Tadayon | G06V 40/172 382/118 |
| 2014/0143784 | A1* | 5/2014 | Mistry | G06F 3/0488 718/102 |
| 2018/0061058 | A1* | 3/2018 | Xu | G06N 3/084 |
| 2019/0030371 | A1* | 1/2019 | Han | A61N 5/1039 |
| 2019/0171936 | A1* | 6/2019 | Karras | G06N 3/084 |
| 2020/0167930 | A1* | 5/2020 | Wang | G06N 3/08 |
| 2020/0258223 | A1* | 8/2020 | Yip | G06V 10/82 |
| 2020/0367974 | A1* | 11/2020 | Khalid | A61B 34/20 |
| 2021/0209797 | A1* | 7/2021 | Lee | G06T 17/00 |
| 2023/0289572 | A1* | 9/2023 | Xiao | G06V 10/764 |

FOREIGN PATENT DOCUMENTS

| | | | |
|---|---|---|---|
| CN | 108846798 | A | 11/2018 |
| CN | 109166107 | A | 1/2019 |
| CN | 109785306 | A | 5/2019 |
| CN | 109801294 | A | 5/2019 |
| CN | 109977978 | A | 7/2019 |
| CN | 110189336 | A | 8/2019 |
| CN | 110415792 | A | 11/2019 |
| CN | 110942072 | A | 3/2020 |
| CN | 111192356 | A | 5/2020 |
| CN | 111260642 | A | 6/2020 |
| CN | 111292289 | A | 6/2020 |
| CN | 111311606 | A | 6/2020 |
| CN | 111340123 | A | 6/2020 |
| CN | 111402260 | A | 7/2020 |
| CN | 111598862 | A | 8/2020 |
| CN | 111738989 | A | 10/2020 |
| CN | 111833372 | A | 10/2020 |
| CN | 111862127 | A | 10/2020 |
| CN | 112001925 | A | 11/2020 |
| KR | 2017-0000040 | A | 1/2017 |
| KR | 101760287 | B1 | 7/2017 |
| WO | 2019/056499 | A1 | 3/2019 |
| WO | 2020006961 | A1 | 1/2020 |
| WO | 2020114332 | A1 | 6/2020 |
| WO | 2020119679 | A1 | 6/2020 |
| WO | 2020/156361 | A1 | 8/2020 |
| WO | 2020199593 | A1 | 10/2020 |

OTHER PUBLICATIONS

Sousa et al., "Learning to segment the lung volume from CT scans based on semi-automatic ground-truth," 2019 IEEE 16th International Symposium on Biomedical Imaging (ISBI 2019), Venice, Italy, Apr. 8-11, 2019 (Year: 2019).*

First Office Action issued in Chinese Patent Application No. 2020116262160 dated Dec. 26, 2023, along with English translation thereof.

Wang Ziya, "Text Detection of Food Labels based on Semantic Segmentation", China Academic Journal Electronic Publishing House 1994-2021, along with Abstract translation.

Lin Chengchuang et al., "AS-PANet: a chromosome instance segmentation method based on improved path aggregation network architecture", Journal of Image and Graphics, vol. 25, No. 10, Oct. 2020, p. 2271-2280, along with Abstract translation.

First Office Action issued in Chinese Patent Application No. CN202011643646.3 dated Dec. 1, 2023, along with English translation thereof.

Fang Wang, "Studies Based on The ROI Division's Three Dimensional Reconstruction Algorithm", Science and Technology Innovation Herald dated Feb. 21, 2011, No. 06, p. 218-220, along with Abstract translation.

Sui-juan Ding, "Simulation Study on Accurate Diagnosis of CT Lesions in Human Brain", Computer Simulation dated Jul. 15, 2017, p. 294 -297, along with Abstract translation.

First Office Action issued in Chinese Patent Application No. CN202011613802.1 dated Jun. 25, 2024, along with English translation thereof.

First Office Action issued in Chinese Patent Application No. 202011613841.1 dated Jun. 21, 2024, along with English translation thereof.

Second Office Action issued in Chinese Patent Application No. 202011613841.1 dated Nov. 29, 2024, along with English translation thereof.

Second Office Action issued in Chinese Patent Application No. 202011643646.3 dated Mar. 29, 2024, along with English translation thereof.

Hu Zhang et al. "Design on the Cross-platform Three-dimensional Reconstruction from Medical Images" Medical Recapitulate, Dec. 20, 2010, vol. 16, No. 24, p. 3806.

* cited by examiner

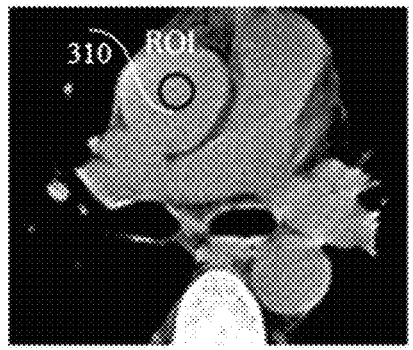

FIG. 3

| The pixels, which each are in the original image to be segmented and have a horizontal ordinate greater than 0 and less than or equal to the set sampling step size and have a longitudinal ordinate greater than 0 and less than or equal to the set sampling step size, are determined to be the candidate sampling start points, respectively. | S3410 |

↓

| By taking each of the candidate sampling start points as the actual sampling start points, down-sampling is performed on the original image to be segmented, to obtain down-sampled images corresponding to each of the candidate sampling start points | S3420 |

↓

| The down-sampled images are input to the trained neural network model, respectively, to obtain the segmented region images of the ROI corresponding to each of the down-sampled images | S3430 |

↓

| The segmented region images of the ROI corresponding to each of the down-sampled images are stitched to the original image to be segmented, to obtain a segmented image corresponding to the original image | S3440 |

FIG. 4

```
┌─────────────────────────────────────────────────────────┐
│  A first preprocessed image is obtained, and the first  │  S4110
│  preprocessed image is input into the trained segmentation │
│  model, to obtain the first pretested result. The trained │
│  segmentation model is obtained through training based on │
│  the preprocessed images and a sample set of labelled data. │
└─────────────────────────────────────────────────────────┘
                              │
                              ▼
┌─────────────────────────────────────────────────────────┐  S4120
│  The first pretested result is input into the regression model, │
│  to obtain an evaluation result for the trained segmentation │
│  model. The regression model is configured to calculate a │
│  similarity between a distribution regularity of the pretested │
│  result and a distribution regularity of the labelled data. │
└─────────────────────────────────────────────────────────┘
```

FIG. 10

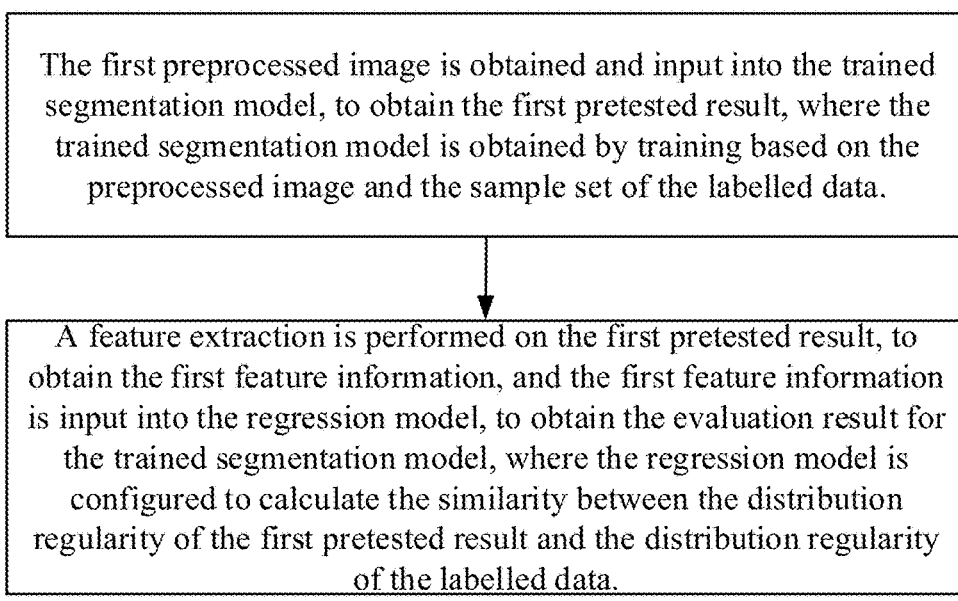

FIG. 11

IMAGE SEGMENTATION METHOD, DEVICE, EQUIPMENT AND STORAGE MEDIUM

CROSS-REFERENCE TO RELATED APPLICATIONS

The present application claims priority benefits from China Patent Application No. 202011613841.1, filed on Dec. 30, 2020, entitled "Image Segmentation Method, Device, Equipment and Storage Medium", China Patent Application No. 202011643646.3, filed on Dec. 31, 2020, entitled "Image Segmentation Method, System, Electronic Equipment, and Computer Readable Storage Medium", China Patent Application No. 202011613802.1, filed on Dec. 30, 2020, entitled "Image Segmentation Method, Device, Electronic Equipment and Storage Medium", and China Patent Application No. 202011626216.0, filed on Dec. 31, 2020, entitled "Model Evaluation Method, Device, Equipment, and Medium", the contents of which are also hereby incorporated by reference.

TECHNICAL FIELD

The embodiments of the present application relate to the field of image processing technology, and in particular, to an image segmentation method, device, equipment, and storage medium.

BACKGROUND

Currently, image segmentation may be divided into manual segmentation and automatic segmentation. Although the accuracy of manual segmentation is relatively high, the accuracy of manual segmentation is largely related to prior knowledge of the operator. Moreover, the manual segmentation process takes a long time, and need spend more efforts and time. Therefore, it is particularly important and urgent to realize automatic segmentation of images.

Since 2012, the deep learning model has been widely used in the field of image processing, and the accuracy of the automatic segmentation algorithm based on deep learning has also been improved year by year. However, the training for the existing deep learning model is focused on only the learning of the visual feature of the object in the image, but in practical applications, the information included in the image is not limited to the visual feature information, therefore, during the image segmentation by using an existing deep learning model, the accuracy of image segmentation is not high.

In addition, during image segmentation by using the deep learning technology, due to the limitation of video memory, it is often required to clip or down-sample the original image before segmentation, so as to solve the problem of insufficient memory in the Graphic Processing Unit (GPU).

However, clipping the original image will cause the loss of context information or space information, thus reducing the accuracy of image segmentation. However, directly segmenting the low-resolution image obtained by down-sampling will cause the detailed features to lose, and it is impossible to ensure both the accuracy of image segmentation and the high resolution of the image.

In view of the above problems, the current conventional practice is to use a multi-scale segmentation strategy, which includes following specific steps. First, the low-resolution image obtained by down-sampling is segmented by using a coarse segmentation network, to obtain an approximate location of the region of interest (ROI), and then the ROI is cut out from the original image according to the approximate location, and finally, based on the ROI cut out, a segmentation result with the same resolution as the original image is obtained by using a fine segmentation network. In this method, the global context information is introduced into the coarse-scale segmentation stage, but at the fine-scale segmentation stage, as the fine segmentation is performed on the basis of the clipped image, the global context information is still lost, and the problem that the segmentation accuracy and the resolution cannot be both ensured has not been solved yet.

Furthermore, since the deep learning is a supervised machine learning algorithm, it is necessary to train the deep learning model and evaluate the performance of the model based on a large number of labeled data (also often called "gold standard" in medical images), so as to improve the accuracy and generalization of the model, so scientific researchers and engineering personnel are increasingly demanding for labelled data, and the requirements for the quality of the labelled data are becoming higher and higher, therefore a lot of manpower is needed to label the data.

When evaluating for the accuracy and other performance of the trained machine learning model, medical experts may generally be organized to judge the output results of the model. However, the evaluation scheme occupies a relatively high manpower cost, and medical experts' judgments on disease results may also be subjectively affected by experience and cognition. Therefore, the evaluation scheme of the machine learning model in the prior art needs to be improved.

SUMMARY

In view of the above problem, the embodiment of the present application provides an image segmentation method, so as to improve the accuracy of image segmentation and ensure high resolution of the segmented image.

The present application provides an image segmentation method, including: obtaining an original image to be segmented; preprocessing the original image to be segmented, comprising, by taking each candidate sampling start point as an actual sampling start point, down-sampling the original image to be segmented, and obtaining down-sampled images corresponding to each candidate sampling start point; inputting preprocessed images into a trained segmentation model to obtain an object segmented image corresponding to the original image.

In some embodiments, the trained segmentation model is the trained segmentation model is a target neural network model, before the inputting preprocessed images into the trained segmentation model to obtain the object segmented image corresponding to the original image, the image segmentation method further comprises training the segmentation model based on standard segmented images and standard contour information to obtain the target neural network model, wherein the standard contour information is configured to characterize positioning information of an image segmentation unit in each of the standard segmented images in at least one dimension direction.

In some embodiments, the target neural network model comprises a feature extraction module, an image segmentation module, an intermediate deep supervision module and a terminal deep supervision module. The feature extraction module is configured to output a feature vector based on each of the input preprocessed images. The intermediate deep supervision module is configured to output intermediate contour information based on an input feature vector. The image segmentation module is configured to output the object segmented image corresponding to the original image based on the input feature vector and input intermediate contour information. The terminal deep supervision module is configured to output object contour information based on the object segmented image.

In some embodiments, the image segmentation module comprises a first image segmentation module and at least one second image segmentation module. The intermediate contour information comprises first intermediate contour information and second intermediate contour information. The intermediate deep supervision module comprises a first intermediate deep supervision module and at least one second intermediate deep supervision module, and the first intermediate deep supervision module is configured to output the first intermediate contour information based on the input feature vector. The first image segmentation module is configured to output a first segmented image based on the input feature vector and the first intermediate contour information. The second intermediate deep supervision module is configured to output the second intermediate contour information based on the first segmented image. The second image segmentation module is configured to output a second segmented image based on the first segmented image and the second intermediate contour information, and the second segmented image comprises the object segmented image.

In some embodiments, the standard segmented images comprise training standard segmented images, and the standard contour information comprises training standard contour information. The training the segmentation model based on the standard segmented images and the standard contour information to obtain the target neural network model comprises: obtaining training images in a training set and testing images in a testing set; inputting the training images into an initial neural network model, and based on the training standard segmented images, the training standard contour information, and training pretested segmented images and training pretested contour information which are output by the initial neural network model, performing an iterative training on the initial neural network model, to obtain at least one intermediate neural network model; inputting the testing images into each of the at least one intermediate neural network model, and based on an output testing pretested segmented image, determining an evaluation result corresponding to each of the at least one intermediate neural network model; taking one of the at least one intermediate neural network model, whose evaluation result meets the preset evaluation standard, as the target neural network model.

In some embodiments, the based on the training standard segmented images, the training standard contour information, and the training pretested segmented images and the training pretested contour information which are output by the initial neural network model, performing the iterative training on the initial neural network model, to obtain the at least one intermediate neural network model, includes the following steps.

A first loss function is determined based on the training pretested segmented images and the training standard segmented images, and determining a second loss function based on the training pretested contour information and the training standard contour information.

The initial neural network model is iteratively trained based on the first loss function, the second loss function, and a preset optimizer, to obtain at least one intermediate neural network model.

In some embodiments, the image segmentation method further includes: obtaining the training standard segmented images, and based on an image unit size in at least two dimensions of the image unit in each of the training standard segmented images, determining an object dimension direction having a highest degree of anisotropy; and obtaining positioning information of the image segmentation unit in the training standard segmented image in the object dimension direction, and generating the training standard contour information based on the positioning information.

In some embodiments, after the preprocessing the original image to be segmented, the image segmentation method further includes: dividing the preprocessed images into the training images in the training set and the testing images in the testing set based on a preset ratio; and performing data enhancement on the training images in the training set, and adding data-enhanced training images into the training set.

In some embodiments, before the inputting preprocessed images into the trained segmentation model to obtain the object segmented image corresponding to the original image, the image segmentation method further includes: obtaining a first preprocessed image, and inputting the first preprocessed image into the trained segmentation model, to obtain a first pretested result, wherein the trained segmentation model is obtained through training based on the preprocessed images and a sample set of labelled data; inputting the first pretested result into a regression model, to obtain an evaluation result for the trained segmentation model, where the regression model is configured to calculate a similarity between a distribution regularity of a first pretested result and a distribution regularity of the labelled data; determining whether the evaluation result meets the predetermined standard, and if the evaluation result does not meet the predetermined standard, further training the trained segmentation model.

In some embodiments, the image segmentation method further comprising a training process for the regression model, and the training process for the regression model includes: obtaining a second preprocessed image, and labelling a ROI of the second preprocessed image to obtain a labelled result; inputting the second preprocessed image into the trained segmentation model to obtain a second pretested result; and training the regression model by taking the labeled result and the second pretested result as samples.

In some embodiments, the training the regression model by taking the labeled result and the second pretested result as samples, includes: obtaining a measurement index based on the labelled result and the second pretested result, wherein the measurement index characterizes a similarity between a distribution regularity of the second pretested result and a distribution regularity of the labelled data; and training the regression model by taking the measurement index and the second pretested result as samples.

In some embodiments, the training the regression model by taking the measurement index and the second pretested result as samples, includes performing a feature extraction on the second pretested result to obtain second feature information, and training the regression model based on the second feature information and the measurement index.

In some embodiments, the inputting the first pretested result into the regression model includes: performing feature extraction on the first pretested result to obtain the first feature information, and inputting the first feature information into the regression model.

In some embodiments, the inputting preprocessed images into the trained segmentation model to obtain the object segmented image corresponding to the original image includes: inputting the down-sampled images into the trained segmentation model, and obtaining segmented region images of regions of interest (ROI) corresponding to the down-sampled images respectively, where the trained segmentation model is a target neural network model; and stitching the segmented region images of the ROI corresponding to each of the down-sampled images to the original image to be segmented, to obtain the object segmented image corresponding to the original image.

In some embodiments, before the preprocessing the original image to be segmented, the image segmentation method further includes determining pixels to be the candidate sampling start points, respectively, where the pixels each are located in the original image to be segmented, have a horizontal ordinate greater than 0 and less than or equal to a set sampling step size, and have a longitudinal ordinate greater than 0 and less than or equal to the set sampling step size.

In some embodiments, by taking each candidate sampling start point as the actual sampling start point, down-sampling the original image to be segmented, and obtaining the down-sampled images corresponding to each candidate sampling start point includes: a mapping relationship between each pixel of each of the down-sampled images and each pixel of the original image to be segmented is determined according to a set sampling step size and each candidate sampling start point; and determining the down-sampled images based on the mapping relationship.

In some embodiments, the stitching the segmented region images of the ROI corresponding to each of the down-sampled images to the original image to be segmented, to obtain the object segmented image corresponding to the original image, includes mapping each of the segmented region images of the ROI to the original image to be segmented according to a mapping relationship between each pixel of each of the segmented region images of the ROI and each pixel of the original image to be segmented, to obtain the object segmented image corresponding to the original image.

In some embodiments, the mapping each of the segmented region images of the ROI to the original image to be segmented according to the mapping relationship between each pixel of each of the segmented region images of the ROI and each pixel of the original image to be segmented, to obtain the object segmented image corresponding to the original image, includes: mapping each of the segmented region images of the ROI corresponding to each of the down-sampled images to the original image to be segmented based on a conversion formula of:

$$M(x,y)=M^{REM(x/N),REM(y/N)}(INT(x/N)+1,INT(y/N+1)+1)$$

where, M(x, y) represents the object segmented image corresponding to the original image, $M^{REM(x/N),REM(y/N)}$(INT(x/N)+1, INT(y/N+1)+1) represents the segmented region image of the ROI of the down-sampled image corresponding to an actual sampling start point (REM((x/N),REM(y/N)), REM( ) represents a remainder operation, INT( ) represents a rounding operation, N represents a set sampling step size, and (x, y) represent coordinates of a pixel.

According to another aspect of the present application, an image segmentation method is provided, and includes: obtaining an original image to be segmented; preprocessing the original image to be segmented, comprising: setting a three-dimensional region characterizing a region of interest (ROI) in the original image; and inputting preprocessed images into a trained segmentation model to obtain an object segmented image corresponding to the original image.

In some embodiments, the inputting preprocessed images into the trained segmentation model to obtain the object segmented image corresponding to the original image includes cutting out data of the original image, which are in the three-dimensional region, and inputting the data of the original image into the trained segmentation model, to segment an object region in the ROI.

In the image segmentation method provided by the embodiment of the present application, the original image to be segmented is obtained, and the preprocessing the original image to be segmented, including by taking each candidate sampling start point as the actual sampling start point, down-sampling the original image to be segmented, and obtaining down-sampled images corresponding to each candidate sampling start point. The preprocessed images are input into the trained segmentation model to obtain the object segmented image corresponding to the original image. The present application solves the problem that the segmentation accuracy and the resolution cannot be both ensured, thereby guaranteeing not only the accuracy of the image segmentation, but also the resolution of the image.

DESCRIPTION OF THE DRAWINGS

FIG. 3 is a schematic diagram of a segmented region image of a ROI according to an embodiment of the present application;

FIG. 4 is a schematic flowchart of the image segmentation method according to another embodiment of the present application;

FIG. 10 is a flowchart of a segmentation model evaluation of the image segmentation method according to another embodiment of the present application;

FIG. 11 is a flowchart of the segmentation model evaluation of the image segmentation method according to another embodiment of the present application;

DETAILED DESCRIPTION OF EMBODIMENTS

The present application will be further described in detail herein by combining the accompanying drawings and embodiments. It may be understood that the specific embodiments described herein are only used to explain the present application, but not intended to limit the present application. In addition, it should be noted that, for convenience of description, the accompanying drawings only show part of the structure related to the present application instead of all of the structure.

Embodiment One

Figure 1:
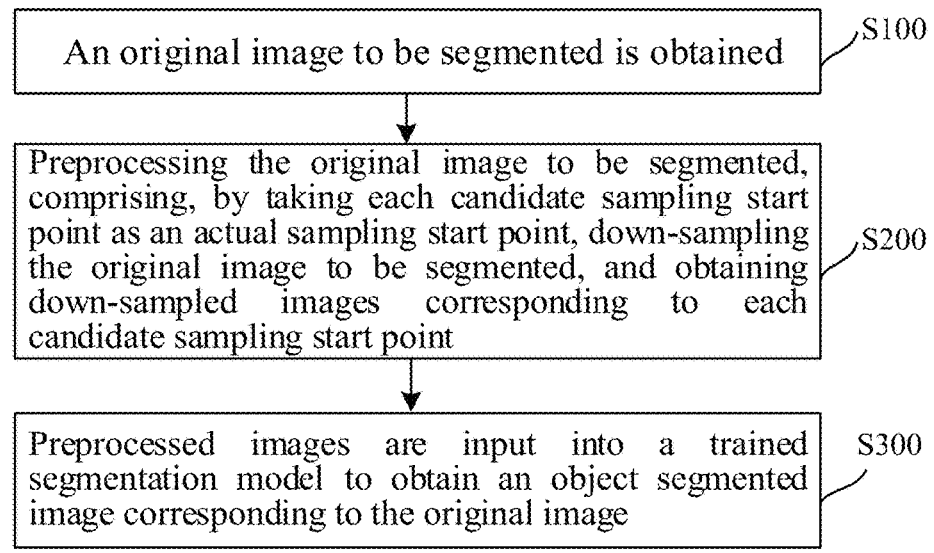
FIG. 1 is a flowchart of an image segmentation method according to an embodiment of the present application.

FIG. 1 is a flowchart of an image segmentation method according to an embodiment of the present application. This embodiment may be applied to the situation of image segmentation, and the method may be executed by an image segmentation device, which may be implemented by means of software and/or hardware. The device may be configured in a terminal device. For example, the terminal device may be an intelligent terminal such as a mobile terminal, a desktop computer, a notebook, a tablet computer, or a server. Specifically, the method includes the following steps.

In step S100, an original image to be segmented is obtained.

In step S200, the original image to be segmented is preprocessed, and preprocessing the original image to be segmented includes, by taking each candidate sampling start point as an actual sampling start point, down-sampling the original image to be segmented, and obtaining down-sampled images corresponding to each candidate sampling start point;

In step S300, preprocessed images are input into a trained segmentation model to obtain a segmented image corresponding to the original image.

In step S100, the original image to be segmented is obtained. Specifically, the original image to be segmented may be a medical image.

The medical image is an image of a certain particular modality, may also be an image with a certain resolution, or may also be an image of multiple modalities or an image with multiple resolutions. Taking the medical image being a magnetic resonance imaging (MRI) image as an example, the MRI image may be a T1-weighted image, or a T2-weighted image, or may also be an apparent diffusion coefficient (ADC), or a diffusion weighted imaging (DWI) image.

Specifically, the computer device may perform a three-dimensional reconstruction based on the data of the patient's body parts to be examined, which are collected by the scanning device, thus obtaining the medical images. It should be noted that the medical images may also be reconstructed in advance and stored in a computer device, and when they are needed, the medical images may be directly read from the memory of the computer device. The computer device may also obtain the medical images from an external device. For example, the medical images are stored in the cloud, and when needed, the medical images of the patient may be obtained from the cloud by the computer device. The ways of obtaining the medical images are not limited in this embodiment.

In some embodiments, the medical images are but not limited to a tomographic scan images sequence.

In order to solve the problem that the segmentation accuracy and the resolution cannot be both ensured during image segmentation, the image segmentation method provided by the embodiments of the present application may be executed by an image segmentation device, which may be implemented by means of software and/or hardware.

In step S200, preprocessing the original image to be segmented includes by taking each candidate sampling start point as the actual sampling start point, down-sampling the original image to be segmented, to obtain the down-sampled images corresponding to each candidate sampling start point.

Specifically, the number of candidate sampling start points is usually multiple, and the specific number may be determined according to the set sampling step size and the size of the original image to be segmented. The more the number of candidate sampling start points, the more the corresponding down-sampled images are obtained, and the more comprehensively each part of the image information of the original image to be segmented may be obtained. The original image to be segmented may be a computer tomography (CT) image, a positron emission tomography (PET) image, an MRI image, or a fusion image. The fusion image is the fusion image of at least two types of images of the CT image, the PET image, and the MRI image.

Specifically, the down-sampling of the original image to be segmented includes steps of: taking the actual sampling start point as a reference point, acquiring sampling points in each row of the original image to be segmented at intervals of a set sampling step size, and acquiring sampling points in each column of the original image to be segmented at intervals of the set sampling step size, and the sampling points forming a down-sampled image corresponding to the actual sampling start point.

Figure 2:
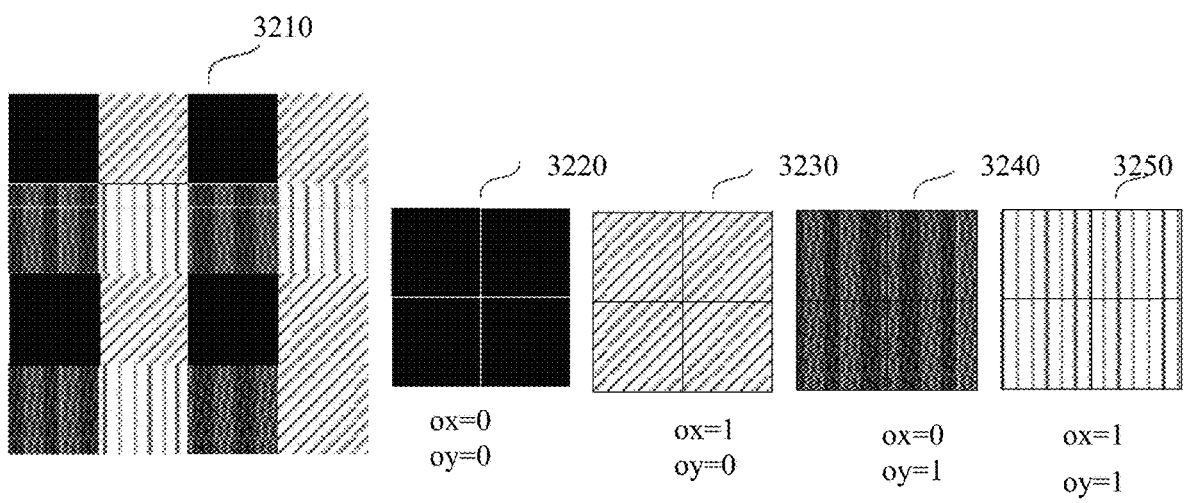
FIG. 2 is a schematic diagram showing different down-sampled images corresponding to different actual sampling start points according to an embodiment of the present application.

Exemplarily, refer to FIG. 2, a schematic diagram showing different down-sampled images corresponding to different actual sampling start points according to an embodiment of the present application. In the figure, the reference numeral 3210 represents an original image to be segmented, a width W of the image to be segmented is W=4, and a height H thereof is H=4, and the set sampling step size N=2. The reference numeral 3220 represents the down-sampled image corresponding to the actual sampling start point (0, 0). The reference numeral 3230 represents the down-sampled image corresponding to the actual sampling start point (1, 0). The reference numeral 3240 represents the down-sampled image corresponding to the actual sampling start point (0, 1). The reference numeral 3250 represents the down-sampled image corresponding to the actual sampling start point (1, 1).

In step S300, the preprocessed images are input into a trained segmentation model to obtain a segmented image corresponding to the original image.

Specifically, the step S300 of inputting the preprocessed images into the trained segmentation model to obtain the segmented image corresponding to the original image includes: inputting the down-sampled images into the trained segmentation model, and obtaining the segmented region images of the ROI corresponding to the down-sampled images respectively. Where, the trained segmentation model is a trained neural network.

In some embodiments, the number of the down-sampled images is multiple, and the specific number may be determined according to the set sampling step size and the size of the original image to be segmented. For example, if the set sampling step size is N, according to the different locations of actual sampling start points, a two-dimensional original image to be segmented with a size of H×W may be divided into N×N down-sampled images each with a size of (H/N)×(W/N). The more the number of the down-sampled images are, the more comprehensively the image information of each part of the original image to be segmented may be obtained.

The down-sampled images each are input into the trained neural network model, respectively, and for each of the down-sampled images, the neural network model outputs a corresponding segmented region image of the ROI. The segmented region image of the ROI refers to an image obtained by segmentation. The segmented region image is generally a specific region outlined by means of a frame, a circle, an ellipse, or an irregular polygon. Exemplarily, refer to FIG. 3, a schematic diagram of a segmented region image of a ROI. The reference numeral 310 represents a circled ROI. It should be understood that what is directly seen in the visual level is the circled ROI, while in the technical level, the coordinate positions of the pixels of the segmented region image of the ROI may be obtained.

It should be noted that each image region of the down-sampled image has the same resolution. In some embodiments, the segmented region image of the ROI is a binary image. Specifically, the binary image may be an image in which the pixel value of the pixel in the ROI is 1, and the pixel value of the pixel outside the ROI is 0. Or, the pixel value of the pixel in the ROI is 0, and the pixel value of the pixel outside the ROI is 1.

Specifically, the trained neural network model may be obtained by pre-training different types of neural networks selected according to the characteristics of the original image to be segmented. For example, since the ascending aorta presents a feature of a circular shape, the neural network model may specifically be a detection network, a segmentation network, or a positioning network. When the original image to be segmented is an image of the pulmonary artery, the neural network model may specifically include a neural network main body, a segmentation network branch and a point positioning network branch. Specifically, the segmentation network branch is configured to output the segmentation result of the pulmonary artery trunk, and the point positioning network branch is configured to output a position of a positioning point of the pulmonary aorta trunk.

Further, the locations of the ROI of different parts of object are different. For example, the ROI of the head and carotid artery is usually located at the descending aortic of the aortic arch, the ROI of the pulmonary artery is usually located at the right pulmonary artery trunk, the ROI of the coronary artery is usually located at the ascending aorta, and the ROI of the thoracic aorta is usually located at the descending aorta at the tracheal bifurcation, the ROI of the abdominal aorta is usually located at the horizontal descending aorta of the renal artery, the ROI of the renal artery is usually located at the horizontal descending artery of the renal artery, and the ROI of the lower limbs is usually located at the upper part of the abdominal arterial bifurcation, the ROI of the upper limbs is usually located at the aortic arch.

During the train of the neural network model, the sampling start points are randomly generated, and the original image to be segmented is down-sampled to obtain different down-sampled images, then each of the down-sampled images is input into the neural network model respectively, to train the neural network model and optimize various model parameters of the neural network model.

In step S300, the inputting the preprocessed images into the trained segmentation model to obtain the segmented image corresponding to the original image, further includes: stitching the segmented region images of the ROI corresponding to each of the down-sampled images to the original image to be segmented, to obtain the object segmented image corresponding to the original image.

It is understandable that the down-sampling the original image to be segmented makes the image resolution to be reduced, and at the same time makes the requirements for the memory of GPU to be reduced, but also causes detailed information of the image to be lost. Therefore, if image segmentation is performed directly based on the down-sampled images, the resolution of the segmented image is usually not high. In view of this problem, in the technical solution of this embodiment, the segmented region images of the ROI corresponding to each of the down-sampled images are stitched to the original image to be segmented, to obtain the final segmented image with the same resolution as the original image to be segmented. During the image segmentation, the original image to be segmented is not clipped, therefore the purpose of reserving the contextual image information is achieved, which is beneficial to the accuracy of the image segmentation. Moreover, the original image to be segmented is down-sampled to reduce the requirements for the GPU, but finally the segmented region images of the ROI corresponding to each of down-sampled images are stitched, therefore the resolution of the image, namely the clarity of the image, is guaranteed, and the result of image segmentation is improved.

Exemplarily, the stitching the segmented region images of the ROI corresponding to each of the down-sampled images to the original image to be segmented, to obtain the segmented images corresponding to the original image includes the following steps. According to a mapping relationship between each pixel of each of the segmented region images of the ROI and each pixel of the original image to be segmented, each of the segmented region images of the ROI is mapped to the original image to be segmented, to obtain the segmented images corresponding to the original image.

In the image segmentation method provided by this embodiment, by taking each of the candidate sampling start points as the actual sampling start point, the original image to be segmented is down-sampled, to obtain the down-sampled images corresponding to each of the candidate sampling start points. The down-sampled images are input to the trained neural network model, respectively, to obtain the segmented region images of the ROI corresponding to the down-sampled images. The segmented region images of the ROI corresponding to the down-sampled images are stitched to the original image to be segmented, to obtain the segmented image corresponding to the original image. The technical scheme solves the problem that the segmentation accuracy and the resolution cannot be both ensured, thereby guaranteeing not only the accuracy of the image segmentation, but also the resolution of the image.

Embodiment Two

FIG. 4 is a schematic flowchart of the image segmentation method according to another embodiment of the present application. Based on the above embodiment, this embodiment further provides a method for determining the candidate sampling start points. Specifically, pixels in the original image to be segmented, each of which has a horizontal ordinate greater than 0 and less than or equal to a set sampling step size, and has a longitudinal ordinate greater than 0 and less than or equal to the set sampling step size, are determined to be the candidate sampling start points, respectively. The advantage of this configuration is that all possible sampling points can be traversed to obtain the information of each part of the original image to be segmented more comprehensively. On the other hand, this embodiment also provides a specific implementation method for obtaining down-sampled images and stitching the segmented region images of the ROI corresponding to each of the down-sampled images to the original image to be segmented. The same or similar illustrations mentioned in the above embodiment may be referred to the above embodiment, and will not be described repeatedly in this embodiment.

As shown in FIG. 4, the image segmentation method includes the following steps.

In step 3410, the pixels, which each are in the original image to be segmented and have a horizontal ordinate greater than 0 and less than or equal to the set sampling step size and have a longitudinal ordinate greater than 0 and less than or equal to the set sampling step size, are determined to be the candidate sampling start points, respectively.

By setting the limiting conditions that the horizontal ordinate is greater than 0 and less than or equal to the set sampling step size, and that the longitudinal ordinate is greater than 0 and less than or equal to the set sampling step size, the purpose of traversing all possible sampling points is achieved, thereby achieving the purpose of obtaining the image information of each part of the original image to be segmented more comprehensively.

In step 3420, by taking each of the candidate sampling start points as the actual sampling start points, down-sampling is performed on the original image to be segmented, to obtain down-sampled images corresponding to each of the candidate sampling start points.

Specifically, the mapping relationship between each pixel of each of the down-sampled images and each of the pixels of the original image to be segmented is determined according to the set sampling step size and the candidate sampling start points. The down-sampled images are determined according to the mapping relationship.

For example, it is assumed that W represents the width of the original image to be segmented, and H represents the height thereof, and I (x, y) represent the pixel value of the pixel located in the yth row and in the xth column of the original image to be segmented, where $0<y\leq H$, and $0<x\leq W$.

Specifically, the pixel value of each pixel of the down-sampled image is determined according to the following formula:

$$I^{ox,oy}(x',y')=I(ox+(x'-1)\times N, oy+(y'-1)\times N)$$

Where, $0<x'\leq W/N$, and $0<y'\leq H/N$, coordinates of the actual sampling start point are (ox, oy), N represents the set sampling step size, W represents the width of the original image to be segmented, H represents the height of the original image to be segmented, (x', y') represent the coordinates of the sampling point, $I^{ox,oy}(x', y')$ represents the pixel value of the pixel (x', y') in the down-sampled image, and $I(ox+(x'-1)\times N, oy+(y'-1)\times N)$ represents the pixel value of the pixel in the original image to be segmented corresponding to the sampling point (x', y').

In step 3430, the down-sampled images are input to the trained neural network model, respectively, to obtain the segmented region images of the ROI corresponding to each of the down-sampled images, respectively.

In step 3440, the segmented region images of the ROI corresponding to each of the down-sampled images are stitched to the original image to be segmented, to obtain a segmented image corresponding to the original image.

Exemplarily, according to the mapping relationship between each pixel of each of the segmented region images of the ROI and each pixel of the original image to be segmented, each of the segmented region images of the ROI is mapped to the original image to be segmented, to obtain the object segmented image corresponding to the original image.

Specifically, each of the segmented region images of the ROI is mapped to the original image to be segmented based on the following conversion formula:

$$M(x,y)=M^{REM(x/N),REM(y/N)}(\text{INT}(x/N)+1,\text{INT}(y/N+1)+1)$$

Where, M(x, y) represents the segmented image corresponding to the original image, $M^{REM(x/N),REM(y/N)}(\text{INT}(x/N)+1, \text{INT}(y/N+1)+1)$ represents the object segmented region image of the ROI of the down-sampled image corresponding to the actual sampling start point (REM(x/N), REM(y/N)), REM( ) represents a remainder operation, INT( ) represents a rounding operation, N represents the set sampling step size, and (x, y) represent the coordinates of the pixel.

Furthermore, since the processing accuracy of the neural network model cannot reach 100%, the pixels of the segmented region image of the ROI output by the neural network model corresponding to each down-sampled image cannot not completely overlap the pixels at corresponding locations of the original image to be segmented. Therefore, the edge of the stitched segmented image M(x, y) may not be smooth. In view of this problem, the image segmentation method provided by this embodiment also includes the following steps.

A post-processing is performed on the segmented image, to smooth the edge of the segmented image.

The post-reprocessing includes image post-processing algorithms, such as dilation and erosion. Image dilation and erosion are two basic morphological operations, which are mainly used to find a maximal region and a minimal region in the image. The dilation is similar to "region expansion", which dilates the highlighted region or the white part of the image, and the highlight region in the operated result image is larger than that in the original image. The erosion is similar to "region being corroded", which reduces and refines the highlight region or the white part of the image, and the highlight region in the operated result image is smaller than that in the original image. Finally, the purpose of optimizing the edge of the image is achieved.

The image segmentation method provided by this embodiment is based on the above technical solutions. The pixels, each of which is in the original image to be segmented and has the horizontal ordinate greater than 0 and less than or equal to the set sampling step size and has the longitudinal ordinate greater than 0 and less than or equal to the set sampling step size, are determined to be the candidate sampling start points, respectively. The advantage of this configuration is that all possible sampling points can be traversed to obtain the image information of each part of the original image to be segmented more comprehensively. Moreover, the post-processing is further performed on the image segmentation result, thereby realizing the purpose of smoothing the edge of the segmented image, improving the result of the image segmentation, and guaranteeing the image resolution while preserving the image context information.

The embodiments of the image segmentation device provided by the examples of the present application are as follows. The device has the same inventive concept as the above-described embodiments of the image segmentation method. For the details that are not described in detail in the embodiments of the image segmentation device, please refer to the embodiments of the image segmentation method above.

Embodiment Three

Figure 5:
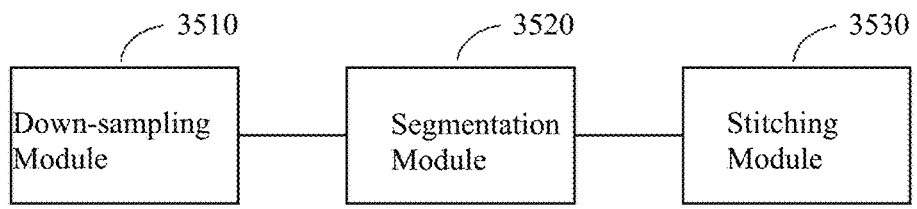
FIG. 5 is a schematic structural diagram showing an image segmentation device according to another embodiment of the present application.

FIG. 5 is a schematic structural diagram showing an image segmentation device according to another embodiment of the present application. As shown in FIG. 5, the image segmentation device includes a down-sampling module 3510, a segmentation module 3520, and a stitching module 3530.

The down-sampling module 3510 is configured to, by taking each of candidate sampling start points as an actual sampling start point, down-sample the original image to be segmented, to obtain the down-sampled images corresponding to each candidate sampling start point. The segmentation module 3520 is configured to input down-sampled images into a trained neural network model to obtain segmented images of ROI corresponding to each of the down-sampled images. The stitching module 3530 is configured to stitch the segmented region images of the ROI corresponding to each of the down-sampled images to the original image to be segmented, to obtain a segmented image corresponding to the original image.

Based on each of the above technical solutions, the image segmentation device further includes a determining module configured to determine the candidate sampling start points according to a set sampling step size.

Based on each of the above technical solutions, the determining module is specifically configured to determine pixels, each of which is in the original image to be segmented, and has a horizontal ordinate greater than 0 and less than or equal to the set sampling step size, and has a longitudinal ordinate greater than 0 and less than or equal to the set sampling step size, to be the candidate sampling start points, respectively.

Based on each of the above technical solutions, the down-sampling module 3510 is specifically configured to determine a pixel value of each pixel of the down-sampled image based on the following formula:

$$I^{ox,oy}(x',y')=I(ox+(x'-1)\times N, oy+(y'-1)\times N)$$

Where, $0<x'\leq W/N$, and $0<y'\leq H/N$, coordinates of the actual sampling start point are (ox, oy), N represents the set sampling step size, W represents the width of the original image to be segmented, H represents the height of the original image to be segmented, (x', y') represent the coordinates of the sampling point, $I^{ox,oy}(x', y')$ represents the pixel value of the pixel (x', y') in the down-sampled image, and $I(ox+(x'-1)\times N, oy+(y'-1)\times N)$ represents the pixel value of the pixel in the original image to be segmented corresponding to the sampling point (x', y').

Based on each of the above technical solutions, the stitching module 3530 includes a mapping unit configured to, according to a mapping relationship between each pixel of each of the segmented region images of the ROI and each of pixels of the original image to be segmented, map each of the segmented region images of the ROI to the original image to be segmented, to obtain the segmented image corresponding to the original image.

Based on each of the above technical solutions, the mapping unit is specifically configured to map the segmented region images of the ROI to the original image to be segmented based on the following conversion formula:

$$M(x,y)=M^{REM(x/N),REM(y/N)}(INT(x/N)+1, INT(y/N+1)+1)$$

Where, M(x, y) represents the segmented image corresponding to the original image, $M^{REM(x/N),REM(y/N)}(INT(x/N)+1, INT(y/N+1)+1)$ represents the segmented region image of the ROI of the down-sampled image corresponding to the actual sampling start point (REM(x/N),REM(y/N)), REM( ) represents a remainder operation, INT( ) represents a rounding operation, N represents a set sampling step size, and (x, y) represent the coordinates of the pixel.

Based on each of the above technical solutions, the image segmentation device further includes a post-processing module, configured to post-process the segmented image, so as to smooth the edge of the segmented image.

In the image segmentation device provided by the embodiments of the present application, by taking each of the candidate sampling start points as the actual sampling start point, the original image to be segmented is down-sampled, to obtain the down-sampled images corresponding to each of the candidate sampling start points. The down-sampled images are input to the trained neural network model, respectively, to obtain the segmented region images of the ROI corresponding to the down-sampled images. The segmented region images of the ROI corresponding to the down-sampled images are stitched to the original image to be segmented, to obtain the segmented image corresponding to the original image. The technical scheme solves the problem that the segmentation accuracy and the resolution cannot be both ensured, thereby guaranteeing not only the accuracy of the image segmentation, but also the resolution of the image.

The image segmentation device provided by the embodiments of the present application may execute the image segmentation method provided by any embodiment of the present application, may include the corresponding functional modules for executing the image segmentation method, and may achieve beneficial effects.

Embodiment Four

Figure 6:
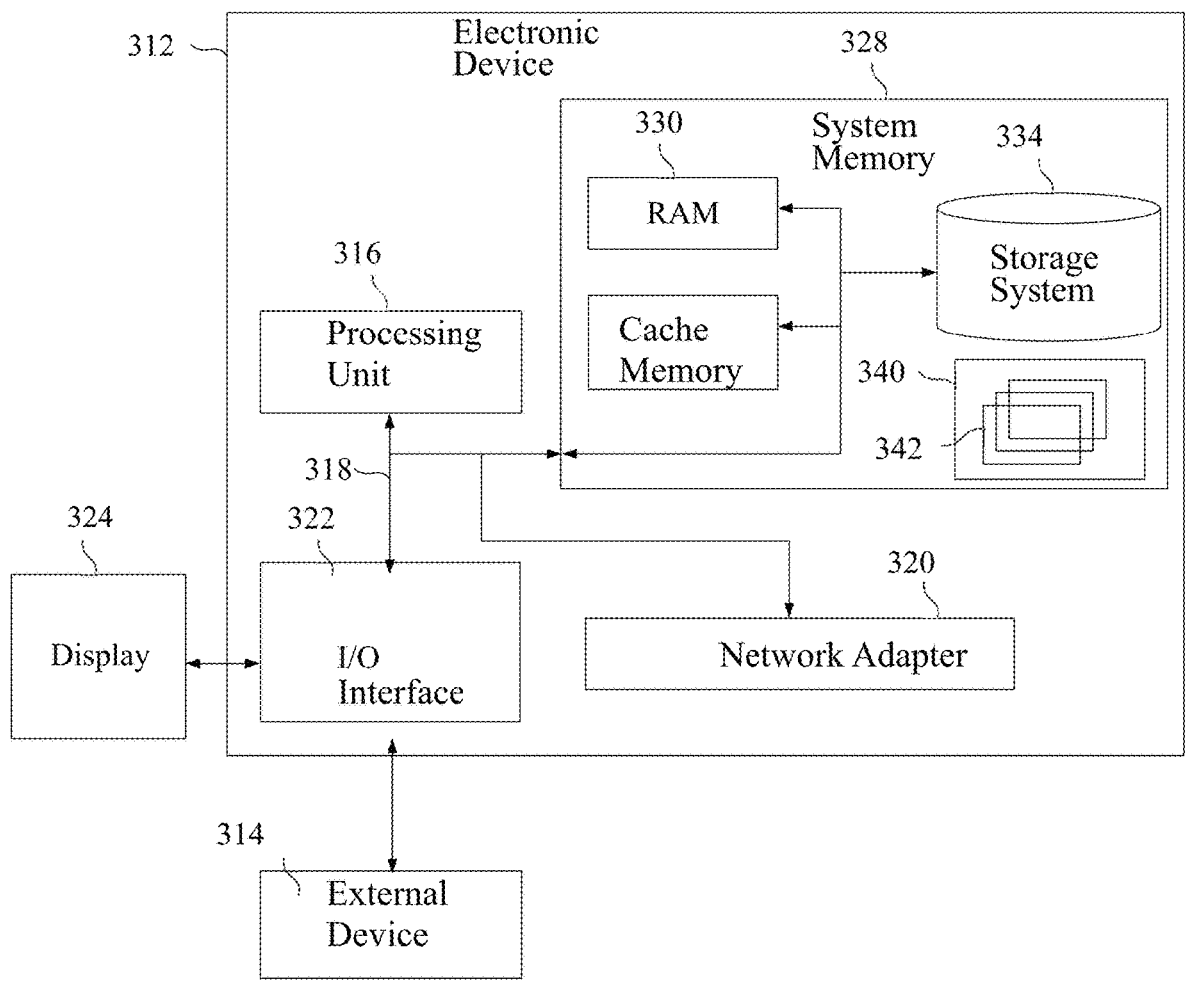
FIG. 6 is a schematic structural diagram showing an electronic device according to another embodiment of the present application.

FIG. 6 is a schematic structural diagram showing an electronic device according to another embodiment of the present application. FIG. 6 shows a block diagram of an exemplary electronic device 312 applicable for implementing the embodiments of the present application. The electronic device 312 shown in FIG. 6 is only an example, but not intended to limit the function and application field of the embodiments of the present application.

As shown in FIG. 6, the electronic device 312 is represented in the form of a general-purpose computing electronic device. The components of the electronic device 312 may include, but are not limited to: one or more processors or processing units 316, a system memory 328, and a bus 318 connecting different system components (including the system memory 328 and the processing unit 316).

The bus 318 represents one or more of bus structures, and includes a memory bus or a memory controller, a peripheral bus, a graphics acceleration port, a processor, or a local bus of any bus structure among a variety of bus structures. For example, these architectures include but are not limited to industry standard architecture (ISA) bus, Micro Channel Architecture (MCA) bus, enhanced ISA bus, Video Electronics Standards Association (VESA) local bus, and peripheral component interconnection (PCI) bus.

The electronic device 312 typically includes a variety of computer system readable media. These media may be any available media including volatile and non-volatile media, removable and non-removable media, which can be accessed by the electronic device 312.

The system memory 328 may include a computer system readable medium in the form of volatile memory, such as random-access memory (RAM) 330 and/or cache memory 332. The electronic device 312 may further include other removable/non-removable, volatile/non-volatile computer system storage media. For example only, the storage system 334 may read and write a non-removable, non-volatile magnetic media (not shown in FIG. 6, but generally referred to as a "hard disc drive"). Although not shown in FIG. 6, a disk drive for reading and writing to removable non-volatile disks (such as "floppy disks") and an optical disk drive for reading and writing to removable non-volatile optical disk (such as CD-ROM, DVD-ROM, or other optical media) may be provided. In these cases, each drive may be connected to the bus 318 through one or more data media interfaces. The system memory 328 may include at least one program product, and the program product has a set of (for example, at least one) program modules, and these program modules are configured to perform the functions of each embodiment of the present application.

A program/utility tool 340 having a set of (at least one) program module 342 may be stored, for example, in the system memory 328. The program module 342 includes but is not limited to an operating system, one or more application programs, other program modules, and programs data, each of or a combination of these examples may include the realization of a network environment. The program module 342 usually executes the functions and/or methods of the embodiments described in the present application.

The electronic device 312 may also communicate with one or more external devices 314 (for example, a keyboard, a pointing device, a display 324, etc.), and may also communicate with one or more devices that enable a user to interact with the electronic device 312, and/or may communicate with any device (such as a network card, a modem, etc.) that enables the electronic device 312 to communicate with one or more other computing devices. This communication can be carried out through an input/output (I/O) interface 322. In addition, the electronic device 312 may also communicate with one or more networks (for example, a local area network (LAN), a wide area network (WAN), and/or a public network such as the Internet) through the network adapter 320. As shown in the figure, the network adapter 320 communicates with other modules of the electronic device 312 through the bus 318. It should be understood that although not shown in the figure, other hardware and/or software modules, including but not limited to microcode, device drivers, redundant processing units, external disk drive arrays, RAID systems, tape drives and data backup storage systems, etc., may be used in conjunction with the electronic device 312.

The processing unit 316, by running programs stored in the system memory 328, executes various functional applications and image segmentation, for example, implements steps of the image segmentation method provided by the embodiments of the present invention. The method includes the following steps.

An original image to be segmented is obtained.

The original image to be segmented is preprocessed, and preprocessing the original image to be segmented includes, by taking each candidate sampling start point as an actual sampling start point, down-sampling the original image to be segmented, and obtaining down-sampled images corresponding to each candidate sampling start point, respectively.

Preprocessed images are input into a trained segmentation model to obtain a segmented image corresponding to the original image.

Of course, those skilled in the art may understand that the processor may also implement the technical solutions of the image segmentation method provided by any embodiment of the present application.

Embodiment Five

Another embodiment of the present application provides a computer-readable storage medium on which a computer program is stored. When executing the program, a processor implements steps of the image segmentation method provided by any embodiment of the present application. The method includes the following steps.

An original image to be segmented is obtained.

The original image to be segmented is preprocessed, and preprocessing the original image to be segmented includes, by taking each candidate sampling start point as an actual sampling start point, down-sampling the original image to be segmented, and obtaining down-sampled images corresponding to each candidate sampling start point, respectively.

Preprocessed images are input into a trained segmentation model to obtain a segmented image corresponding to the original image.

The computer storage medium of the embodiment of the present application may be one of or any combination of more computer-readable media. The computer-readable medium may be a computer-readable signal medium or a computer-readable storage medium. The computer-readable storage medium may be, for example, but not limited to: an electrical, magnetic, optical, electromagnetic, infrared, or semiconductor system, device, or apparatus, or any combination thereof. More specific examples (a non-exhaustive list) of the computer-readable storage media include: electrical connections by means of one or more wires, portable computer disks, hard disks, random access memory (RAM), read-only memory (ROM), erasable programmable read-only memory (EPROM or flash memory), optical fiber, portable compact disk read-only memory (CD-ROM), optical storage device, magnetic storage device, or any suitable combination thereof. In the present disclosure, the computer-readable storage medium may be any tangible medium that contains or stores a program, and the program may be used by or used in conjunction with an instruction execution system, device, or apparatus.

The computer-readable signal medium may include data signals propagated in baseband or propagated as a part of a carrier wave, and carries computer-readable program codes therein. This propagated data signals may have a plurality of forms, including but not limited to electromagnetic signals, optical signals, or any suitable combination thereof. The computer-readable signal medium may also be any computer-readable medium other than the computer-readable storage medium. The computer-readable medium may send, propagate, or transmit the program used by or used in conjunction with the instruction execution system, device, or apparatus.

The program codes stored in the computer-readable medium may be transmitted by any suitable medium, including but not limited to: wireless, wire, optical cable, RF, etc., or any suitable combination thereof.

The computer program codes used to perform the operations of the present application may be written with one or more programming languages or a combination thereof. The programming languages include object-oriented programming languages, such as Java, Smalltalk, C++, and conventional procedural programming language, such as "C" language or similar programming language. The program codes may be executed entirely on the user's computer, executed partly on the user's computer, executed as an independent software package, executed partly on the user's computer and partly on a remote computer, or executed entirely on a remote computer or a server. In the case of a remote computer is related, the remote computer may be connected to the user's computer through any kind of network, including a local area network (LAN) or a wide area network (WAN), or may be connected to an external computer (for example, by an Internet service provider through the Internet connection).

Those of ordinary skill in the art should understand that the above-mentioned modules or steps of the present application may be implemented by a general computing device and may be concentrated on a single computing device or distributed on a network including a plurality of computing devices. Optionally, the modules or steps may be implemented through program codes executable by a computer device, so that they may be stored in a storage device and executed by a computing device, or they may be made into individual integrated circuit modules, or multiple modules or multiple steps of them are made into a single integrated circuit module to be implemented. In this way, the present application is not limited to any combination of specific hardware and software.

Those skilled in the art may understand that all or part of the steps in the above embodiments of the method may be executed by instructing relevant hardware through a program. The program is stored in a storage medium and includes several instructions to enable a device (which may be a single-chip microcomputer, a chip, etc.) or a processor to execute all or part of the steps of each embodiment described in the present application. The aforementioned storage media include U disk, mobile hard disk, read-only memory (ROM), random access memory (RAM), magnetic disks, optical disks, or other media that may store program codes.

Embodiment Six

In another embodiment of the present application, the segmentation model may be, for example, a trained neural network model namely a target neural network model. The segmentation model is trained on the basis of the standard segmented images and standard contour information. The standard contour information is configured to characterize positioning information of the image segmentation unit in the standard segmented image in at least one dimension direction. The segmented image corresponding to the original image includes the object segmented image and object contour information.

Exemplarily, the standard segmented image is an image including an image segmentation unit, and the image segmentation unit is configured to describe an image unit belonging to the segmented part in the standard segmented image. The standard contour information is configured to describe anisotropic information corresponding to the segmented part in the standard segmented image. In an embodiment, optionally, the standard segmented images include training standard segmented images and testing standard segmented images, and correspondingly, the standard contour information includes training standard contour information and testing standard contour information.

Specifically, when the standard segmented image is a two-dimensional image, the image unit is an image pixel. When the standard segmented image is a three-dimensional image, the image unit is an image voxel. In an embodiment, when the original image is a two-dimensional image, the object contour information output by the target neural network model includes the X-axis directional and/or the Y-axis directional positions information of the image segmentation pixels in the object segmented image. In another embodiment, when the original image is a three-dimensional image, the object contour information output by the target neural network model includes at least one of the X-axis directional, the Y-axis directional, and the Z-axis directional positions information of the image segmentation voxels in the object segmented image.

Figure 7A:
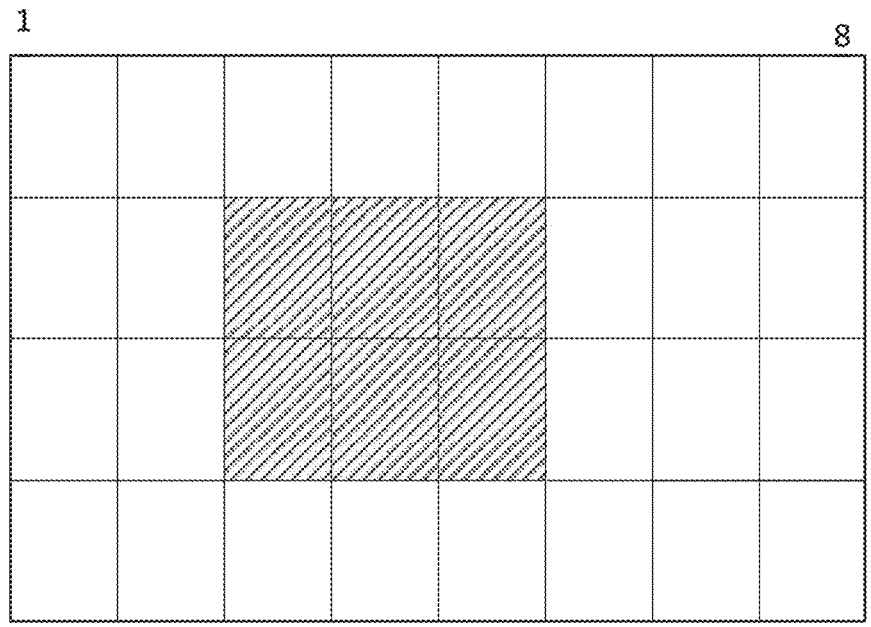
FIG. 7A is a schematic diagram showing a standard contour information according to an embodiment of the present application.

FIG. 7A is a schematic diagram of a standard contour information provided by an embodiment of the present application. FIG. 7A shows a standard segmented image containing 8×4 image pixels. The shaded squares in FIG. 7A represent image segmentation pixels in the standard segmented image, and the blank squares represent image non-segmentation pixels in the standard segmented image. If the pixel layer that contains image segmentation pixels is marked as 1, and the pixel layer that does not contain image segmentation pixels is marked as 0, the standard contour information in the X-axis direction of the image segmentation pixels is [0,0,1,1,1,0,0,0], the standard contour information in the Y-axis direction is [0,1,1,0].

In an embodiment, optionally, the target neural network model includes a feature extraction module, an image segmentation module, an intermediate deep supervision module and a terminal deep supervision module. The feature extraction module is configured to output a feature vector based on an input preprocessed image, the intermediate deep supervision module is configured to output the intermediate contour information based on an input feature vector, and the image segmentation module is configured to output the object segmented image corresponding to the original image based on the input g feature vector and the input intermediate contour information. The terminal deep supervision module is configured to output the object contour information based on the object segmented image.

Specifically, the intermediate deep supervision module introduces the intermediate contour information learned through training into the image segmentation module as an attention, so that the target neural network model has the ability to learn and recognize the anisotropic information in the image.

Figure 7B:
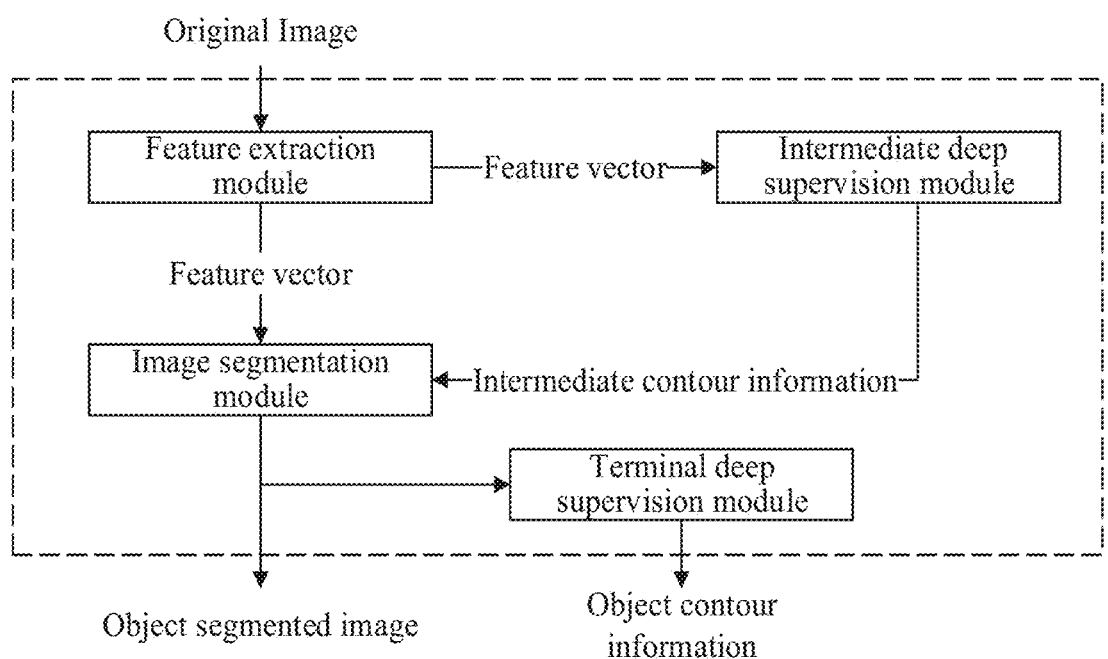
FIG. 7B is a schematic diagram showing a target neural network model according to an embodiment of the present application.

FIG. 7B is a schematic diagram showing a target neural network model according to an embodiment of the present application. Specifically, the dashed frame represents the target neural network model, and the segmented image corresponding to the original image includes the object segmented image and the object contour information. In some embodiments, the feature extraction module is an encoder module, and the image segmentation module is a decoder module. Exemplarily, the feature vector may be a feature map output by the encoder module corresponding to the original image.

In some embodiments, the intermediate contour information includes first intermediate contour information and second intermediate contour information. The intermediate deep supervision module includes a first intermediate deep supervision module and at least one second intermediate deep supervision module. The first intermediate deep supervision module is configured to output the first intermediate contour information based on the input feature vector. The first image segmentation module is configured to output a first segmented image based on the input feature vector and the input first intermediate contour information. The second intermediate deep supervision module is configured to output the second intermediate contour information based on the first segmented image, and the second image segmentation module is configured to output a second segmented image based on the first segmented image and the second intermediate contour information. Where, the second segmented image includes the object segmented image.

Figure 7C:
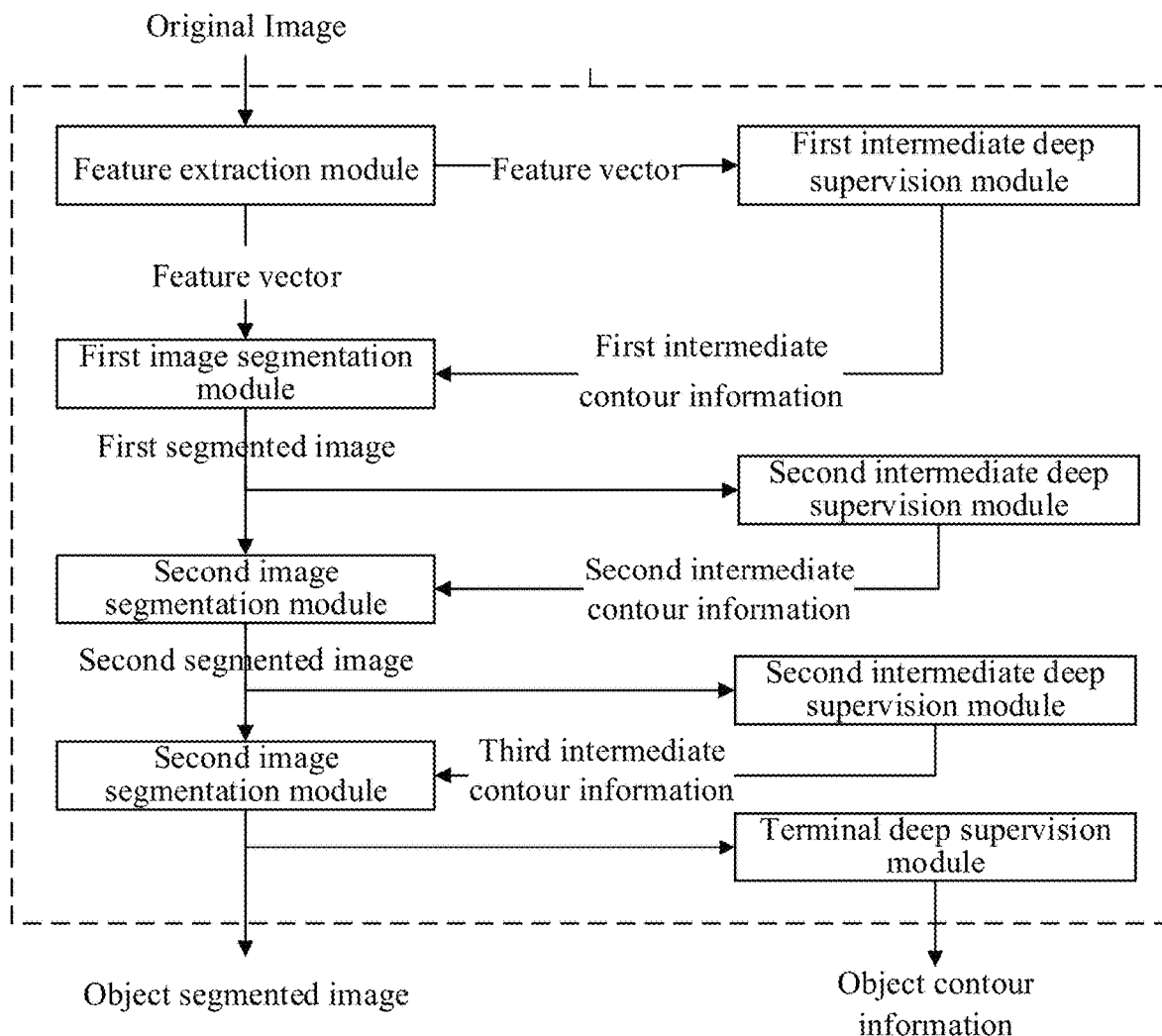
FIG. 7C is a schematic diagram showing the target neural network model according to another embodiment of the present application.

FIG. 7C is a schematic diagram showing the target neural network model according to another embodiment of the present application. Specifically, the target neural network model shown in FIG. 7C includes two second image segmentation modules and two second intermediate deep supervision modules. The number of the second image segmentation modules and the number of the second intermediate deep supervision modules in the target neural network model are not limited herein.

Figure 7D:
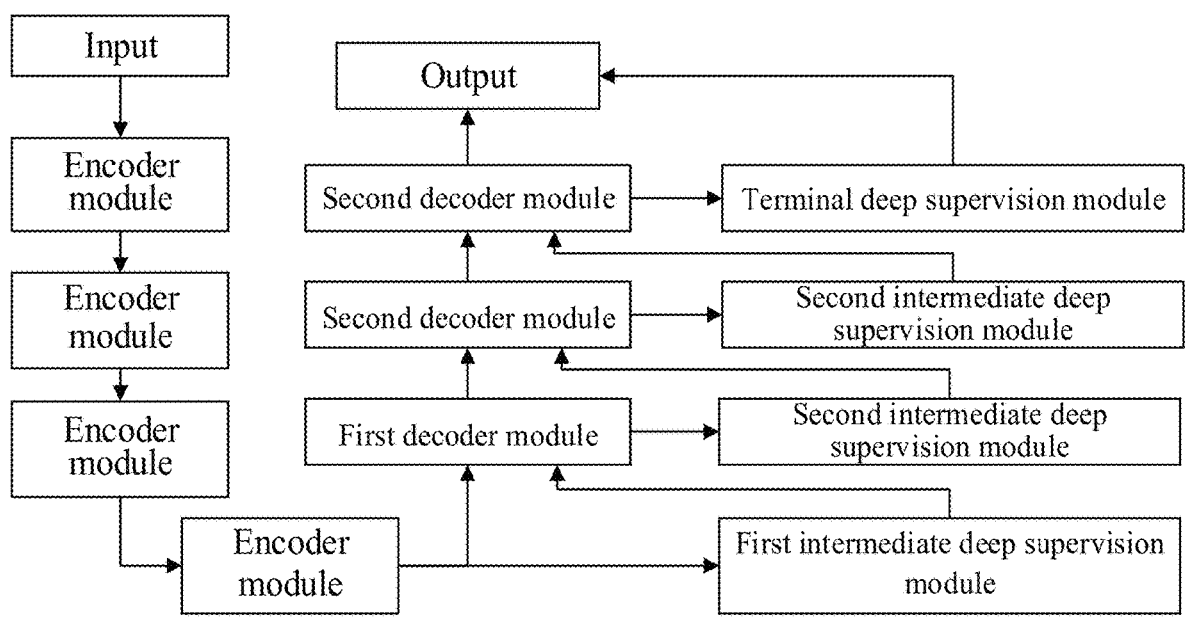
FIG. 7D is a schematic diagram showing a specific example of the target neural network model according to another embodiment of the present application.

FIG. 7D is a schematic diagram showing a specific example of the target neural network model according to another embodiment of the present application. Specifically, the feature extraction module in the target neural network model shown in FIG. 7D includes four encoding modules, and the image segmentation module, specifically, is a decoder module, and the decoder module includes one first decoding module and two second decoding modules.

The technical solutions of embodiments of the present application solve the problem of poor effect of image segmentation performed by the existing neural network model through training the neural network model based on the standard segmented image and the standard contour information, so that not only the visual feature information in the image but also the anisotropy information in the image is focused on during the image segmentation performed by the neural network model, thereby improving the accuracy of image segmentation.

Embodiment Seven

Figure 8:
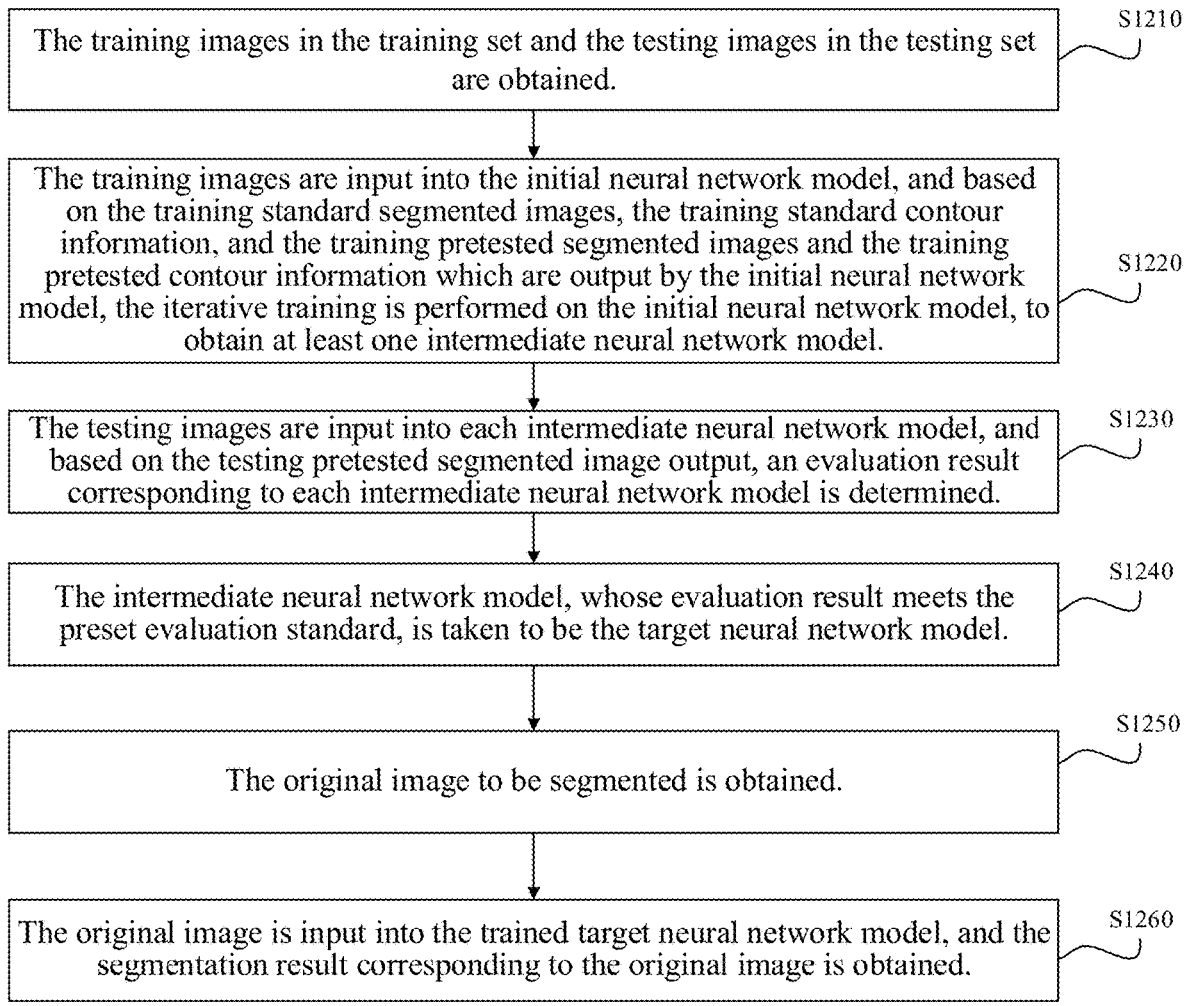
FIG. 8 is a flowchart of the image segmentation method according to another embodiment of the present application.

FIG. 8 is a flowchart of the image segmentation method according to another embodiment of the present application. The technical solution of this embodiment is further described in detail based on the embodiments above. Optionally, the standard segmented images include training standard segmented images, and the standard contour information includes training standard contour information. Correspondingly, the training method of the target neural network model includes: obtaining training images in a training set and testing images in a testing set; inputting the training images into an initial neural network model; based on the training standard segmented images, the training standard contour information, and the training pretested segmented images and the training pretested contour information which are output by the initial neural network model, iteratively training the initial neural network model, to obtain at least one intermediate neural network model; inputting the testing images into each of the intermediate neural network models, and determining an evaluation result corresponding to each of the intermediate neural network models based on a testing pretested segmented image output; taking the intermediate neural network model, whose evaluation result meets a preset evaluation standard, as the target neural network model.

The embodiment of the present application specifically includes the following steps.

In step S1210, the training images in the training set and the testing images in the testing set are obtained.

Specifically, the training images in the training set are configured to iteratively train the initial neural network model, and the testing images in the testing set are configured to test the trained intermediate neural network model.

In an embodiment, optionally, the method also includes following steps. An original image set is obtained, and the original images in the original image set are preprocessed respectively, to obtain preprocessed images. Based on a preset ratio, the preprocessed images are divided into the training images in the training set and the testing images in the testing set. Data enhancement is performed on the training images in the training set, and the data-enhanced training images are added into the training set.

Exemplarily, the original image set includes at least two original images, and the original images may be CT images, MRI images, or PET images.

In some embodiments, the preprocessing includes at least one of a format conversion, a truncation processing, and a normalization processing. Exemplarily, when the original image is a two-dimensional image, the two-dimensional image may be converted into a three-dimensional image through format conversion. Specifically, the original image is truncated on the basis of a preset window level and a preset window width. Optionally, the original images may be a plurality of two-dimensional images.

Taking the CT images as an example, CT equipment may recognize the density difference of 2000 different gray scales, while human eyes can only distinguish 16 gray scales. Therefore, only when a CT value in the CT image is greater than 125 Hu, can the CT image be recognized by the human eyes. A preset window level value is configured to describe a CT value of a center corresponding to the original image truncated, or to describe a mean value of the CT values within the range of the window width. The window level should be equal to or approximate to the CT value corresponding to the tissue image to be segmented. The preset window width value is configured to describe a range of the CT value corresponding to the original image truncated. The window width will affect clarity and a contrast ratio of the original image truncated. Exemplarily, the preset window level is 50 Hu, and the preset window width is 400 Hu.

In an embodiment, optionally, the format conversion, the truncation processing, and the normalization processing are performed on the original images in the original image set in sequence to obtain the preprocessed images.

Exemplarily, the preset ratio may be seven-to-three.

Exemplarily, the data enhancement processing includes at least one of flipping, translation, and rotation. Such a configuration has the advantages that the number of the samples of the training images in the training set is increased, thereby improving the generalization ability of the target neural network model.

In step S1220, the training images are input into the initial neural network model, and based on the training standard segmented images, the training standard contour information, and the training pretested segmented images and the training pretested contour information which are output by the initial neural network model, the iterative training is performed on the initial neural network model, to obtain at least one intermediate neural network model. In this embodiment, the standard segmented images include training standard segmented images, and the standard contour information includes training standard contour information. The training standard segmented images are configured to train the initial neural network model.

In an embodiment, optionally, based on the training standard segmented images, the training standard contour information, and the training pretested segmented images and the training pretested contour information which are output by the initial neural network model, iteratively training the initial neural network model to obtain at least one intermediate neural network model, includes following steps. The first loss function is determined according to the training pretested segmented images and the training standard segmented images. The second loss function is determined according to the training pretested contour information and the training standard contour information. Based on the first loss function, the second loss function, and a preset optimizer, the initial neural network model is iteratively trained to obtain at least one intermediate neural network model.

Exemplarily, the loss function includes but not limited to a 0-1 loss function, an absolute loss function, a logarithmic loss function, a quadratic loss function, an exponential loss function, a Hinge loss function, a cross-entropy loss function, a Dice loss function, a focal loss function, a region-based loss function, or a boundary-based loss function, etc. In an embodiment, optionally, the first loss function is calculated based on the cross-entropy loss function or the Dice loss function, and the second loss function is calculated based on the cross-entropy loss function.

Exemplarily, the preset optimizer includes but not limited to an Adam optimizer, an SGD optimizer, an RMSprop optimizer, etc.

Specifically, the first loss function and the second loss function are output to the preset optimizer. The preset optimizer outputs variations of the model parameters based on a gradient descent algorithm, so as to iteratively train the model parameters of the initial neural network model and minimize the loss functions.

Based on the above embodiments, optionally, the method includes the following steps. The training standard segmented images are obtained. Based on the image unit size in at least two dimensions directions of the image unit in the training standard segmented image, an object dimension direction having a highest degree of anisotropy is determined. The positioning information of the image segmentation unit in the training standard segmented image in the object dimension direction is obtained, and the training standard contour information is generated according to the positioning information.

Exemplarily, the training standard segmented image is a three-dimensional CT segmented image, and the image unit size is the image voxel size, specifically including the voxel size in the X-axis direction, the voxel size in the Y-axis direction, and the voxel size in the Z-axis direction. The voxel sizes in all dimension directions are compared with each other, and the dimension direction corresponding to the largest voxel size is taken as the object dimension direction with the highest degree of anisotropy. For example, the object dimension direction is the Z-axis direction. The positioning information in the Z-axis direction of the image segmentation voxel in the training standard segmented image is obtained. Specifically, a voxel layer in the Z-axis direction, which includes the image segmentation voxels, is marked as 1, and the voxel layer not including the image segmentation voxels is marked as 0, to obtain the training standard contour information.

The advantage of this configuration is that, in this embodiment, the training standard contour information only contains the contour information in one dimension direction, so that the trained target neural network model has a better image segmentation effect for the original image with the anisotropic information in this dimension direction, thereby further improving the accuracy of image segmentation for the original image with the anisotropic information in a single direction.

In step S1230, the testing images are input into each intermediate neural network model, and based on the testing pretested segmented image output, an evaluation result corresponding to each intermediate neural network model is determined.

In this embodiment, the standard segmented images also include the testing standard segmented images. The testing standard segmented images are configured to evaluate the intermediate neural network model. Specifically, based on a preset evaluation algorithm, the testing pretested segmented image, and the testing standard segmented image, the evaluation result corresponding to each intermediate neural network is determined. Exemplarily, the preset evaluation algorithm includes but not limited to a Dice coefficient algorithm, an IOU algorithm, a Hausdorff_95 coefficient algorithm, etc. The preset evaluation algorithm is not limited herein.

In step S1240, the intermediate neural network model, whose evaluation result meets the preset evaluation standard, is taken as the target neural network model.

Exemplarily, when the evaluation result is an evaluation score, the preset evaluation standard may be that the evaluation score is greater than a preset score threshold.

In step S1250, the original image to be segmented is obtained.

In step S1260, the original image is input into the trained target neural network model, and the segmentation result corresponding to the original image is obtained.

In the technical solutions of the embodiments of the present application, the initial neural network model is iteratively trained according to the training images in the training set, and at least one trained intermediate neural network model is evaluated according to the testing images in the testing set. The intermediate neural network model, whose evaluation result meets the preset evaluation standard, is taken as the target neural network model. Compared with the existing target neural network model selected only by the training method based on the training set, the target neural network model selected by the technical solution of the present application may achieve a better segmentation effect for unknown images, thereby further guaranteeing the accuracy of the image segmentation of the target neural network model.

Embodiment Eight

Figure 9:
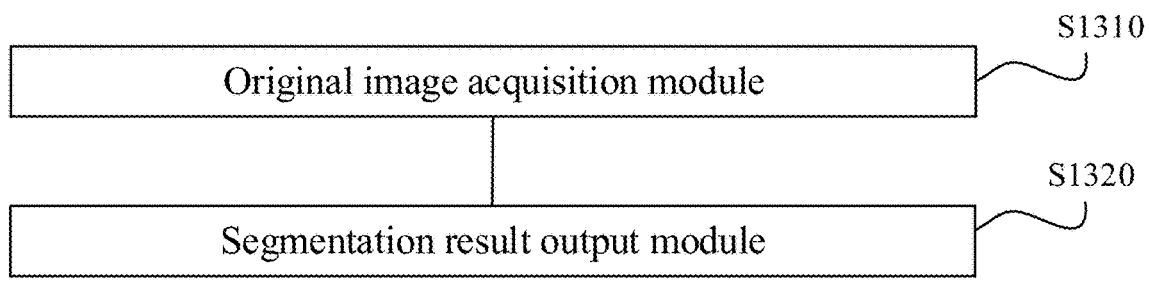
FIG. 9 is a schematic diagram showing the image segmentation device according to another embodiment of the present application.

FIG. 9 is a schematic diagram showing the image segmentation device according to another embodiment of the present application. The embodiment may be applied to the situation of image segmentation. The device may be implemented by software and/or hardware, and the device may be configured in terminal equipment. The image segmentation device includes an original image acquisition module 1310 and a segmentation result output module 1320.

The original image acquisition module 1310 is configured to obtain the original image to be segmented.

The segmentation result output module 1320 is configured to input the original image into the trained target neural network model, to obtain the segmented images corresponding to the original image.

The target neural network model is obtained by training based on the standard segmented image and the standard contour information, and the standard contour information is configured to characterize the positioning information of the image segmentation unit in the standard segmented image in at least one dimension direction.

The technical solution of this embodiment solves the problem of poor effect of image segmentation of the existing neural network model by training the neural network model based on the standard segmented image and the standard contour information, so that when the image is segmented by the neural network model, not only the visual feature information but also the anisotropy information in the image is focused on, thereby improving the accuracy of image segmentation.

Based on the above technical solutions, optionally, the target neural network model includes a feature extraction module, an image segmentation module, an intermediate deep supervision module, and a terminal deep supervision module. The feature extraction module is configured to output the feature vector based on the input original image, the intermediate deep supervision module is configured to output the intermediate contour information based on the input feature vector, and the image segmentation module is configured to output the object segmented image corresponding to the original image based on the input feature vector and the intermediate contour information. The terminal deep supervision module is configured to output the object contour information based on the object segmented image.

Based on the above technical solutions, the image segmentation module includes the first image segmentation module and at least one second image segmentation module. Correspondingly, the intermediate deep supervision module includes the first intermediate deep supervision module and at least one second intermediate deep supervision module. The first intermediate deep supervision module is configured to output a first intermediate contour information based on the input feature vector. The first image segmentation module is configured to output the first segmented image based on the input feature vector and the first intermediate contour information. The second intermediate deep supervision module is configured to output the second intermediate contour information based on the first segmented image, and the second image segmentation module is configured to output the second segmented image based on the first segmented image and the second intermediate contour information. The second segmented image includes the object segmented image. The intermediate contour information includes the first intermediate contour information and the second intermediate contour information.

Based on the above technical solutions, optionally, the standard segmented image includes the training standard segmented image, and the standard contour information includes the training standard contour information. Correspondingly, the image segmentation device further includes a target neural network model training module, configured to: obtain training images in a training set and testing images in a testing set; input the training images into an initial neural network model; based on the training standard segmented images, the training standard contour information, and the training pretested segmented images and the training pretested contour information which are output by the initial neural network model, iteratively train the initial neural network model to obtain at least one intermediate neural network model; input the testing images into each of the intermediate neural network models, and determine an evaluation result corresponding to each of the intermediate neural network models based on a testing pretested segmented image output; take one of the at least one intermediate neural network model, whose evaluation result meets a preset evaluation standard, as the target neural network model.

Based on the above technical solutions, optionally, the target neural network model training module is specifically configured to: determine the first loss function according to the training pretested segmented images and the training standard segmented image, determine the second loss function according to the training pretested contour information and the training standard contour information, and iteratively train the initial neural network model to obtain at least one intermediate neural network model based on the first loss function, the second loss function, and a preset optimizer.

Based on the above technical solutions, the device further includes a training standard contour information generating module, configured to obtain the training standard segmented image, determine one object dimension direction having a highest degree of anisotropy based on the image unit size in at least two dimensions directions of the image unit in the training standard segmented image, obtain the positioning information of the image segmentation unit in the training standard segmented image in the target dimension direction, and generate the training standard contour information based on the positioning information.

In some embodiments, the device also includes: a training set determination module, configured to: obtain the original image set, and preprocess the original images in the original image set respectively, to obtain preprocessed images; divide the preprocessed images into the training images in the training set and the testing images in the testing set based on a preset ratio; perform data enhancement on the training images in the training set, and add the data-enhanced training images into the training set.

The image segmentation device provided by the embodiment of the present application may be configured to execute the image segmentation method provided by the embodiment of the present application, may include the corresponding functional modules for executing the image segmentation method, and may achieve beneficial effects.

It should be noted that, in the embodiments of the above image segmentation device, the units and modules included are divided only according to functional logic, but are not limited to the above division, as long as the corresponding functions may be realized. In addition, the specific names of functional units each are only for the convenience of distinguishing one from another, and not intended to limit the protection scope of the present application.

Embodiment Nine

An embodiment of the present application also provides a storage medium containing computer-executable instructions. When the computer-executable instructions are executed by a computer processor, an image segmentation method is executed, and the image segmentation method includes the following steps. An original image to be segmented is obtained. The original image to be segmented is preprocessed, and preprocessing the original image to be segmented includes, by taking each candidate sampling start point as an actual sampling start point, down-sampling the original image to be segmented, and obtaining down-sampled images corresponding each candidate sampling start point. The preprocessed images are input into a trained segmentation model to obtain a segmented image corresponding to the original image.

The computer storage medium of the embodiment of the present application may be one of or any combination of more computer-readable media. The computer-readable medium may be a computer-readable signal medium or a computer-readable storage medium. The computer-readable storage medium may be, for example, but not limited to: an electrical, magnetic, optical, electromagnetic, infrared, or semiconductor system, device, or apparatus, or any combination thereof. More specific examples (a non-exhaustive list) of the computer-readable storage media include: electrical connections by means of one or more wires, portable computer disks, hard disks, random access memory (RAM), read-only memory (ROM), erasable programmable read-only memory (EPROM or flash memory), optical fiber, portable compact disk read-only memory (CD-ROM), optical storage device, magnetic storage device, or any suitable combination thereof. In the present disclosure, the computer-readable storage medium may be any tangible medium that contains or stores a program, and the program may be used by or used in conjunction with an instruction execution system, apparatus, or device.

The computer-readable signal medium may include a data signal propagated in baseband or as a part of a carrier wave, and stores computer-readable program codes therein. This propagated data signal may have a plurality of forms, including but not limited to electromagnetic signals, optical signals, or any proper combination thereof. The computer-readable signal medium may also be any computer-readable medium other than the computer-readable storage medium. The computer-readable medium may send, propagate, or transmit the program used by or used in conjunction with the instruction execution system, the device, or the apparatus.

The program codes stored in the computer-readable medium may be transmitted by any suitable medium, including but not limited to: wireless, wire, optical cable, RF, etc., or any suitable combination thereof.

The computer program codes configured to perform the operations of the present application may be written with one or more programming languages or a combination thereof. The programming languages include object-oriented programming languages such as Java, Smalltalk, C++, and conventional procedural programming language—such as "C" language or similar programming language. The program codes may be executed entirely on the user's computer, or executed partly on the user's computer, or executed as an independent software package, or executed partly on the user's computer and partly on a remote computer, or executed entirely on a remote computer or a server. In the case of a remote computer is related, the remote computer may be connected to the user's computer by any kind of network, including a local area network (LAN) or a wide area network (WAN), or may be connected to an external computer (for example, by an Internet service provider through the Internet).

I should be noted that, the storage medium contains the computer-executable instructions provided by the embodiments of the present application, and the computer-executable instructions are not limited to operations in the above method, and may also perform related operations in the image segmentation method provided by any embodiment of the present application.

Embodiment Ten

FIG. 10 is a flowchart of a segmentation model evaluation of an image segmentation method according to an embodiment of the present application. This embodiment may be applied to evaluate the trained segmentation model. The evaluation for the trained segmentation model may be performed by a model evaluation unit and specifically includes the following steps.

In step S4110, a first preprocessed image is obtained, and the first preprocessed image is input into the trained segmentation model, to obtain the first pretested result. The trained segmentation model is obtained through training based on the preprocessed images and a sample set of labelled data.

After the segmentation model is trained by the training images, the performance of the segmentation model needs to be tested by the testing image that has not been used for training. If the test passes, it means that the performance of the segmentation model has met the requirements, and the trained segmentation model is obtained and may be used for processing of segmenting images. If the test fails, the network parameters of the segmentation model are adjusted according to the testing images that have not been used for training and the output results corresponding to the testing images, and the training for the segmentation model continues till the target performance is achieved.

Optionally, the segmentation model is configured to label a ROI in the first preprocessed image, to obtain contour data of the ROI as the first pretested result. The first preprocessed image is a human tissue image, and the ROI is a lesion region. The segmentation model may segment the ROI and output image information of the ROI, and may also label a lesion type of the lesion region, for example, label the lesion region as a malignant or benign result, or label a liver lesion region or a heart lesion region.

Generally, when the image segmentation model is tested by the testing image, the ROI of the testing image needs to be labelled. The segmentation model is tested on the basis of the testing image and the corresponding labelled information thereof, and the testing image is input into the segmentation model, to obtain a labelled pretested result. The performance of the segmentation model is tested by the labelled pretested result and the actual labelled information. However, labeling the test result will waste a certain amount of manpower and reduce the training efficiency for the segmentation model. Therefore, in this embodiment, the performance of the segmentation model is tested by a regression model.

The segmentation model is trained by the preprocessed image and the corresponding sample set of labelled data, and the loss function between the output of the training of the segmentation model and the corresponding labelled data is calculated, and the loss function is transferred to the segmentation model by a backpropagation algorithm, and based on a gradient descent method, the network parameters of the segmentation model are adjusted. The above training method is executed iteratively, till a preset number of trainings are completed or the segmentation accuracy of the segmentation model reaches a preset accuracy, it is determined that the training for the segmentation model is completed, and the trained segmentation model is obtained. Optionally, the first preprocessed image may be sample data of the preprocessed images, which are configured to test the trained segmentation model. The first preprocessed image is input into the trained segmentation model to obtain the first pretested result, and the first pretested result is the segmentation result of the first preprocessed image segmented by the segmentation model.

In step S4120, the first pretested result is input into the regression model, to obtain an evaluation result for the trained segmentation model. The regression model is configured to calculate a similarity between a distribution regularity of the first pretested result and a distribution regularity of the labelled data.

The first pretested result is input into the regression model. The output result of the regression model is the evaluation result for the segmentation model. The evaluation result reflects the similarity between the first pretested result and the corresponding actual labelled data.

Optionally, the segmentation model evaluation further includes a training process of the regression model, and the training process specifically includes the following steps. The second preprocessed image is obtained, and the ROI of the second preprocessed image is labelled to obtain a labelled result. Optionally, the second preprocessed image may be sample data of the preprocessed images, which are configured to train the segmentation model to be trained. The second preprocessed image is input into the trained segmentation model, to obtain the second pretested result. The regression model is trained by taking the labeled result and the second pretested result as samples. The second preprocessed image configured to test the trained segmentation model is input into the trained segmentation model, and the second pretested result is output. The second pretested result is the segmentation result of the second preprocessed image. The labelled result corresponding to the second preprocessed image is obtained, and based on the labelled result and the second pretested result, the regression model is trained.

Optionally, training the regression model by taking the labeled result and the second pretested result as samples includes obtaining a measurement index based on the labelled result and the second pretested result, where the measurement index reflects the similarity between the distribution regularity of the second pretested result and the distribution regularity of the labelled data, and includes training the regression model by taking the measurement index and the second pretested result as samples. Optionally, the measurement index may be calculated separately according to the second pretested result and the corresponding labelled result, or may be obtained by the segmentation model. The distribution regularity may be a shape and a location of the ROI, or a labelled location of the lesion region and the labelled result of the lesion region. The regression model is trained by taking the second pretested result, and the measurement index obtained according to the second pretested result and the corresponding labelled result as samples. The second pretested result is input into the regression model to be trained, to obtain the pretested measurement index. The loss function is calculated according to the pretested measurement index and the real measurement index. Exemplarily, when the measurement index includes three indexes: a first index, a second index, and a third index, the loss functions of the three indexes are calculated respectively, and the loss functions of the three indexes are added together to obtain a target loss function. Alternatively, weights may be set for the loss functions corresponding to the three measurement indexes as needed, and the loss functions corresponding to the three measurement indexes are respectively multiplied by the weights and then added together to obtain the target loss function. The objective loss function is input backward the regression model, and the network parameters of the regression model are adjusted by the gradient descent method. Optionally, the loss functions may adopt the Huber loss functions. The above training method is performed iteratively till the preset number of trainings are completed or the accuracy of the measurement index output by the regression model reaches the preset accuracy, it is determined that the training for the regression model is completed.

Optionally, the training the regression model by taking the measurement index and the second pretested result as samples includes performing feature extraction on the second pretested result, to obtain the second feature information, and training the regression model based on the second feature information and the measurement index. Optionally, the feature extraction is performed on the second pretested result, to obtain feature information of the second pretested result. Exemplarily, when the second pretested result is the image information of the ROI, the second feature information includes an area of the ROI, a first distance of the preprocessed image where the current ROI is located, and the position information of the current ROI in the corresponding preprocessed image. The first distance is defined between the current preprocessed image and the first frame of preprocessed image in the same batch of preprocessed images. The preprocessed images of the same batch belong to the scan results of the medical imaging equipment, which are obtained by scanning at the same batch, and they have the same scan parameters and scanned body positions.

Optionally, the measurement index also includes the accuracy rate, sensitivity, and specificity which are calculated by the labelled result and the second pretested result. In addition to the similarity between the distribution regularity of the labelled result and the second pretested result, the measurement index also includes the accuracy rate, the sensitivity and the specificity calculated by the labelled result and the second pretested result. The accuracy rate is obtained by means of dividing the counted number of second pretested results that differ from the labelled results, by the total number of the second pretested results. The sensitivity reflects the recognition ability of the regression model for the input data. The higher the sensitivity, the lower the probability of corresponding labels missed by the segmentation model. For example, in one of the second pretested results, the number of labelled pixels of the ROI is 100, of which 70 pixels match the corresponding labelled result pixels, and 30 pixels are different from the corresponding labelled result pixels. Among the 70 pixels completely matched, 60 pixels are truly matched, and 10 pixels are falsely matched. Among the 30 pixels having differences, 20 pixels really have differences, and 10 pixels falsely have differences. The sensitivity is calculated by dividing the number of the pixels really having differences by the total number of pixels having differences, and is 67%. The specificity is calculated by dividing the number of pixels, which are truly matched by the number of pixels that are completely matched, and is 85%. The higher the specificity, the higher the accuracy rate of the output result of the segmentation model. The regression model is trained by taking the second feature information and the measurement index as samples. Through the regression model, the corresponding relationship between the feature information and the measurement index is obtained, so that the segmentation model may obtain the measurement index of the first pretested result according to the corresponding relationship, and then the intermediate segmentation model is evaluated to obtain the trained segmentation model.

In step S4130, whether the evaluation result meets the predetermined standard is determined, and if the evaluation result does not meet the predetermined standard, a further training is performed on the trained segmentation model. By further training the trained segmentation model, a segmentation model that meets the predetermined standard is obtained.

In the technical solutions of the embodiments of the present application, the first preprocessed image is obtained and input into the trained segmentation model, to obtain the first pretested result. The trained segmentation model is obtained through training based on the preprocessed images and the sample set of the labelled data. The pretested segmentation result of the testing image is obtained, and the pretested segmentation result is further evaluated, thereby evaluating the performance of the segmentation model. The first pretested result is input into the regression model, to obtain the evaluation result for the trained segmentation model. The regression model is configured to calculate the similarity between the distribution regularity of the first pretested result and the distribution regularity of the labelled data. The segmentation model is evaluated by the regression model, thereby solving the problem that the evaluation for the segmentation model performed by medical experts is susceptible to subjectivity, and realizing the effect of reducing labor costs and improving the accuracy of the evaluation for the model.

Embodiment Eleven

FIG. 11 is a flowchart of the segmentation model evaluation of the image segmentation method according to another embodiment of the present application. The technical solution of this embodiment is further described in detail based on the embodiment above. The inputting the first pretested result into the regression model includes performing the feature extraction on the first pretested result to obtain the first feature information, and inputting the first feature information into the regression model. The feature extraction is performed on the first pretested result, and the extracted feature information is input into the regression model, which is more beneficial for the regression model to, according to the corresponding relationship between the feature information and the measurement index, output the measurement index corresponding to the feature information of the first pretested result, thereby further evaluating the segmentation model according to the measurement index of the first pretested result, and improving the efficiency and the accuracy of the model evaluation.

As shown in FIG. 11, the segmentation model evaluation specifically includes the following steps.

In step S4210, the first preprocessed image is obtained and input into the trained segmentation model, to obtain the first pretested result, where the trained segmentation model is obtained by training based on the preprocessed image and the sample set of the labelled data.

In step S4220, a feature extraction is performed on the first pretested result, to obtain the first feature information, and the first feature information is input into the regression model, to obtain the evaluation result for the trained segmentation model, where the regression model is configured to calculate the similarity between the distribution regularity of the first pretested result and the distribution regularity of the labelled data.

Optionally, the feature extraction method for the first pretested result is the same as the feature extraction method for the second pretested result. When the first pretested result is the image information of the ROI, the first feature information includes an area of the ROI, the second distance of the preprocessed image where the current ROI is located, and the position information of the current ROI in the corresponding preprocessed image. The second distance is defined between the current preprocessed image and the first frame of preprocessed image in the same batch of preprocessed images. The preprocessed images of the same batch belong to the scan results of the medical imaging equipment, which are obtained by scanning at the same batch, and they have the same scan parameters and scanned body positions. When the first pretested result is a label of a lesion type, the first feature information includes the location of the lesion in the image, the area of the lesion, and the distance between the image where the current lesion is located and the first frame of preprocessed image in the same batch of preprocessed images. The extracted feature information is input into the regression model, which is more beneficial for the regression model to, according to the corresponding relationship between the feature information and the measurement index, output the measurement index corresponding to the feature information of the first pretested result, thereby further evaluating the segmentation model according to the measurement index of the first pretested result, and improving the efficiency and the accuracy of the model evaluation. In the technical solution of the embodiment of the present application, the first preprocessed image is obtained and input into the trained segmentation model, to obtain the first pretested result. The trained segmentation model is obtained by training based on the preprocessed image and the sample set of the labelled data. The pretested segmentation result of the testing image is obtained, and the pretested segmentation result of the testing image is evaluated, thereby evaluating the performance of the segmentation model. The feature extraction is performed on the first pretested result, to obtain the first feature information. The first feature information is input into the regression model, to obtain the evaluation result for the trained segmentation model. Where, the regression model is configured to calculate the similarity between the distribution regularity of the first pretested result and the distribution regularity of the labelled data. The extracted feature information is input into the regression model, which is more beneficial for the regression model to, according to the corresponding relationship between the feature information and the measurement index, output the measurement index corresponding to the feature information of the first pretested result. The segmentation model is evaluated by the regression model, thereby solving the problem that the evaluation for the segmentation model by the medical experts is susceptible to subjectivity, and realizing the effect of reducing the labor costs and improving the accuracy of the model evaluation.

Embodiment Twelve

Figure 12:
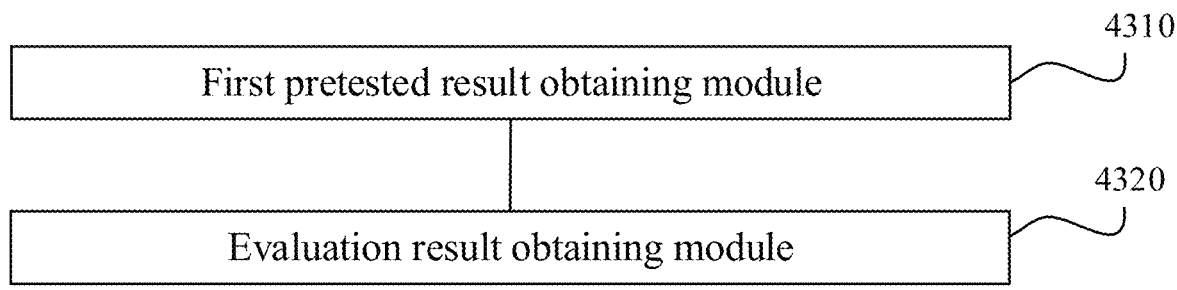
FIG. 12 is a structural diagram showing a segmentation model evaluation unit in the image segmentation device according to another embodiment of the present application.

FIG. 12 is a structural diagram showing a segmentation model evaluation unit in an image segmentation device according to an embodiment of the present application. The model evaluation unit includes a first pretested result obtaining module 4310 and an evaluation result obtaining module 4320.

The first pretested result obtaining module 4310 is configured to obtain the first preprocessed image, and input the first preprocessed image into the trained segmentation model to obtain the first pretested result, where, the trained segmentation model is obtained by training based on the preprocessed image and the sample set of the labelled data. The evaluation result obtaining module 4320 is configured to input the first pretested result into the regression model, to obtain the evaluation result for the trained segmentation model. Where, the regression model is configured to calculate the similarity between the distribution regularity of the first pretested result and the distribution regularity of the labelled data.

In the technical solution of the above embodiment, the model evaluation device further includes a model training module configured to: obtain the second preprocessed image, and label the ROI of the second preprocessed image to obtain a labelled result; input the second preprocessed image into the trained segmentation model to obtain the second pretested result; train the regression model by taking the labeled result and the second pretested result as samples.

In the technical solution of the above embodiment, the model training module includes a measurement index calculation unit configured to obtain a measurement index based on the labelled result and the second pretested result, where the measurement index reflects the similarity between the distribution regularity of the pretested result and the distribution regularity of the labelled data, and a regression model training unit configured to train the regression model by taking the measurement index and the second pretested result as samples.

Optionally, the measurement index also includes the accuracy, the sensitivity, and the specificity, which are calculated according to the labelled result and the second pretested result.

In the technical solution of the above embodiment, the regression model training unit includes a feature extraction subunit configured to perform feature extraction on the second pretested result to obtain the second feature information, and a regression model training subunit configured to train the regression model to be trained based on the second feature information and the measurement index.

In the technical solution of the above embodiment, the evaluation result obtaining module 4320 includes a first feature information obtaining unit configured to perform feature extraction on the first pretested result to obtain the first feature information, and a feature information input unit configured to input the first feature information into the regression model. Optionally, the segmentation model is configured to label the ROI in the preprocessed image to obtain contour data of the ROI as a pretested result. The preprocessed image is a human tissue image, and the ROI is the lesion region.

In the technical solution of the embodiment of the present application, the first preprocessed image is obtained, and input into the trained segmentation model to obtain the first pretested result. The trained segmentation model is obtained by training based on the preprocessed image and the sample set of the labelled data. The pretested segmentation result of the testing image is obtained, and the pretested segmentation result of the testing image is evaluated, thereby evaluating the performance of the segmentation model. The first pretested result is input into the regression model to obtain the evaluation result for the trained segmentation model. The regression model is configured to calculate the similarity between the distribution regularity of the first pretested result and the distribution regularity of the labelled data. The segmentation model is evaluated by the regression model, thereby solving the problem that the evaluation for the segmentation model by the medical experts is susceptible to subjectivity, and realizing the effect of reducing the labor costs and improving the accuracy of the model evaluation.

The segmentation model evaluation unit provided by the embodiment of the present application may execute the model evaluation provided by any embodiment of the present application, may include the corresponding functional modules for executing the image segmentation method, and may achieve beneficial effects.

Embodiment Thirteen

Figure 13:
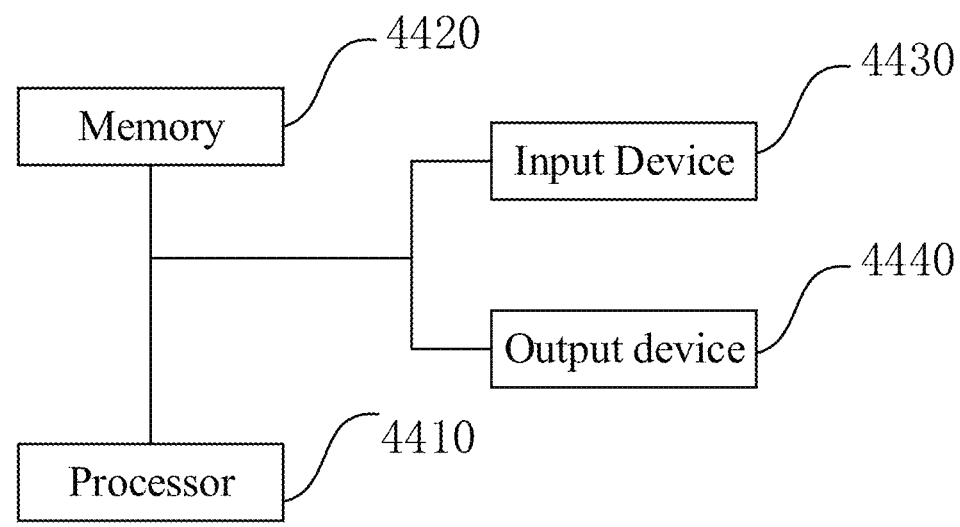
FIG. 13 is a structural diagram showing a segmentation model evaluation equipment in the image segmentation device according to another embodiment of the present application.

FIG. 13 is a structural diagram showing a segmentation model evaluation equipment in the image segmentation device according to an embodiment of the present application. As shown in FIG. 13, the segmentation model evaluation equipment includes a processor 4410, a memory 4420, an input device 4430, and an output device 4440. One or more processors 4410 are included in the segmentation model evaluation equipment. In FIG. 13, one processor 4410 is provided as an example. In the segmentation model evaluation equipment, the processor 4410, the memory 4420, the input device 4430 and the output device 4440 are connected by bus or any other means, and the bus connection is shown in FIG. 13 as an example.

The memory 4420, as a computer-readable storage medium, may be configured to store software programs, computer-executable programs, and modules, such as the program instructions/modules (for example, the first pretested result obtaining module 4310 and the evaluation result obtaining module 4320 in the model evaluation unit) corresponding to the model evaluation in the embodiment of the present application. The processor 4410 executes various functional applications and data processing of the model evaluation device by running the software programs, instructions, and modules stored in the memory 4420, that is, realizes the model evaluation above.

The memory 4420 may mainly include a program storage region and a data storage region. The program storage region may store an operating system and an application program required by at least one function. The data storage region may store data created according to the use of the terminal. In addition, the memory 4420 may include a high-speed random-access memory, and may also include a non-volatile memory, such as at least one magnetic disk storage device, a flash memory device, or other non-volatile solid-state storage devices. In some embodiments, the memory 4420 may further include a memory remotely arranged corresponding to the processor 4410, and the remote memory may be connected to the model evaluation device through a network. Examples of the network include but not limited to the Internet, corporate intranets, local area networks, mobile communication networks, and combinations thereof. The input device 4430 may be configured to receive inputted numeric or character information, and generate key signal inputs related to user settings and function control of the model evaluation device. The output device 4440 may include a display device such as a display screen.

Embodiment Fourteen

An embodiment of the present application further provides a storage medium containing computer-executable instructions, which are configured to perform model evaluation when executed by a computer processor, and the model evaluation includes the following steps.

A first preprocessed image is obtained, and input into the trained segmentation model to obtain the first pretested result. The trained segmentation model is obtained by training based on the preprocessed images and a sample set of the labelled data.

The first pretested result is input into the regression model, to obtain an evaluation result for the trained segmentation model. The regression model is configured to calculate the similarity between the distribution regularity of the first pretested result and the distribution regularity of the labelled data.

It should be noted that a storage medium, containing computer-executable instructions, is provided by the embodiment of the present application, the computer-executable instructions are not limited to operations of the method above, and may also perform related operations in the model evaluation provided by any embodiment of the present application.

Through the above description of the embodiments, those skilled in the art may clearly understand that the present application may be implemented by software and necessary general-purpose hardware, alternatively, the present application may also be implemented by hardware, but in many cases, the former is a better embodiment. Based on such understanding, the technical solutions of the present application essentially, or part of the present application that contributes to the prior art, may be implemented in a form of a software product. The computer software product may be stored in a computer-readable storage medium, such as a computer floppy disk, read-only memory (ROM), random access memory (RAM), flash memory (FLASH), hard disk or optical disk, etc., containing several instructions to enable a computer device (which may be a personal computer, a server, or a network device, etc.) to execute the methods described in each embodiment of the present application. It should be noted that in the embodiment of the above model evaluation device, the included units and modules are divided only according to the functional logic, but not limited to the above division, as long as the corresponding functions may be realized. In addition, specific names of functional units are only for the convenience of distinguishing one from another, and are not used to limit the protection scope of the present application.

Embodiment Fifteen

Another embodiment of the present application provides an image segmentation method, and the image segmentation method includes the following steps.

In step S1001, the original image to be segmented is obtained.

In some embodiments, the original image to be segmented is a two-dimensional image or a three-dimensional image. Exemplarily, the original image to be segmented may be a medical image, such as a computed tomography (CT) image, a magnetic resonance imaging (MRI) image, or a positron emission tomography (PET) image. It should be noted that the original image may also be a landscape image or a person image, and the type of the original image is not limited here.

For example, in the medical field, according to a standard definition of digital imaging and communications in medicine (DICOM), the X-axis direction corresponds to the left and right directions of the human body, the Y-axis direction corresponds to the front (chest) and rear (back) of the human body, and the Z-axis direction corresponds to the upper (head) and lower (foot) directions of the human body. In order to increase the imaging rate, the image unit sizes in the three dimensions directions of the image units in the medical image may be different. For example, the sizes in the X-axis and Y-axis directions of the image unit are relatively small, while the size in the Z-axis direction of the image unit is relatively large, which causes the medical image obtained by imaging to contain not only visual feature information, but also anisotropy information of the image units.

In some embodiments, the medical images are, for example, three-dimensional images. The medical images include several medical images in each of at least three visual fields. The visual field may be a front visual field or a side visual field of the patient, or a visual field perpendicular to a front and a side of the patient. It should be understood that the medical image may be obtained by directly photographing the medical images in three visual fields of the patient. Or, it may be possible that only the medical image in one visual field of the patient is taken, and the medical images in the other two visual fields may be reconstructed by means of three-dimensional reconstruction, thereby obtaining the medical image.

In step S2001, preprocessing the original image to be segmented includes setting a three-dimensional region characterizing the ROI in the original image.

Specifically, the original image is a medical image. A medical image with the ROI in one visual field is selected, and a first two-dimensional region is outlined. Another medical image with the ROI in another visual field is selected, and a second two-dimensional region is outlined. A three-dimensional region is fit by the first two-dimensional region and the second two-dimensional region. In some embodiments, the visual field perpendicular to the front and the side of the patient is regarded as the first visual field, the visual field along the front of the patient is regarded as the second visual field, and the visual field along the side of the patient is regarded as the third visual field. The first visual field, the second visual field, and the third visual field are perpendicular to each other, but should not be limited to this.

Figure 14A:
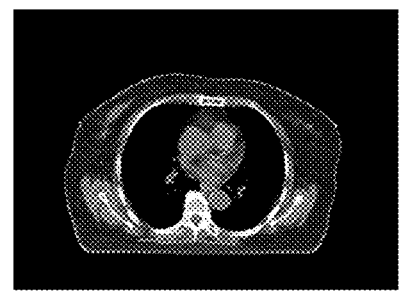
FIGS. 14a-14c graphically show a process of selecting a medical image having a ROI in a first visual field and outlining a first two-dimensional region according to an embodiment of the present application.
Figure 14B:
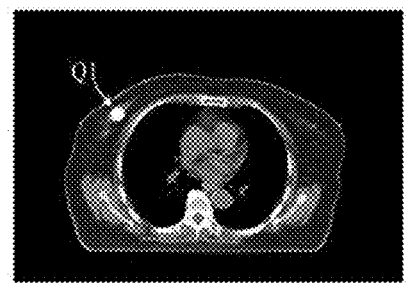
Figure 14C:
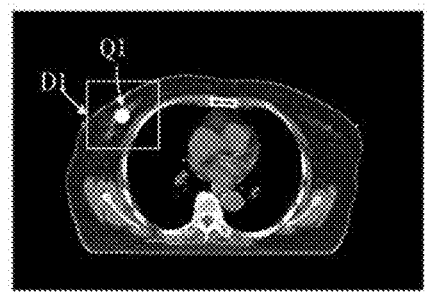

FIGS. 14a to 14c graphically show a process of selecting a medical image having a ROI in a first visual field and outlining a first two-dimensional region according to an embodiment of the present application. As shown in FIG. 14a, the physicist examines several medical images in the first visual field, and selects a medical image with the ROI from the several medical images in the first visual field. As shown in FIG. 14b, the physicist finds out a center point Q1 of the ROI in the selected medical image. It should be understood that the ROI is usually irregular, therefore the center Q1 in this embodiment is only the center of the ROI observed by human eyes, but not the real central position of the ROI. As shown in FIG. 14c, taking the center point Q1 as the center, the first two-dimensional region D1 is outlined in the medical image, and the first two-dimensional region D1 may characterize the ROI in the first visual field.

Figure 15A:
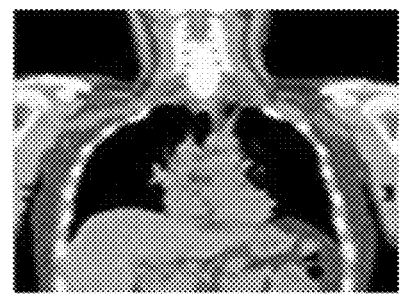
FIGS. 15a-15c graphically show a process of selecting a medical image having the ROI in a second visual field and outlining a second two-dimensional region according to an embodiment of the present application.
Figure 15B:
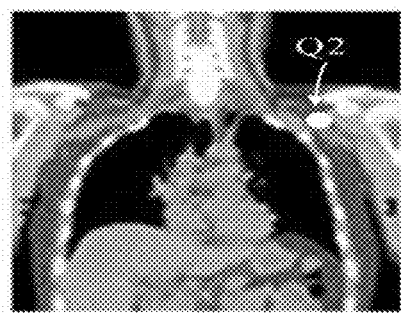
Figure 15C:
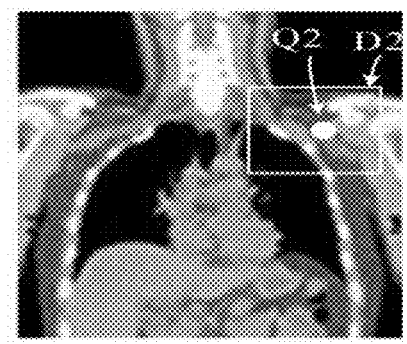

FIGS. 15a-15c graphically show a process of selecting a medical image having the ROI in a second visual field and outlining a second two-dimensional region according to an embodiment of the present application. As shown in FIG. 15a, the physicist examines several medical images in the second visual field, and selects a medical image with the ROI from the several medical images in the second visual field. In this case, the selected ROI in the medical image should be consistent with the ROI in the medical image selected in the first visual field. As shown in FIG. 15b, the physicist finds out the center point Q2 of the ROI in the selected medical image. It should be understood that the ROI is usually irregular, therefore the center Q2 in this embodiment is only the center of the ROI obtained by observing by human eyes, but not the real central position of the ROI. As shown in FIG. 15c, taking the center point Q2 as the center, the second two-dimensional region D2 is outlined in the medical image, and the second two-dimensional region D2 may characterize the ROI in the second visual field.

In some embodiments, the first two-dimensional region D1 and the second two-dimensional region D2 both have a preset shape, and the preset shape may be a rectangle, an ellipse, or a preset shape specifically set according to different tissue characteristics, thereby being better adapted to the segmentation requirements of different tissues. For example, for tumors, the preset shape may be a circle or an ellipse. For bones, the preset shape may be a shape of a model corresponding to the bone. In some embodiments, the first two-dimensional region D1 and the second two-dimensional region D2 are both rectangular. In some embodiments, the first two-dimensional region D1 is a smallest rectangle that may characterize the ROI in the first visual field, and the second two-dimensional region D2 is a smallest rectangle that may characterize the ROI in the second visual field, which facilitates subsequent processing.

It should be understood that by finding the center points of the ROI, the first two-dimensional region D1 and the second two-dimensional region D2 are outlined, so that the ROI may roughly be defined by the first two-dimensional region D1 and the second two-dimensional region D2 in the corresponding visual field. However, the present application is not limited to the means above. As long as the first two-dimensional region D1 and the second two-dimensional region D2 that characterize the ROI may be outlined by means of a method, such a method is within the scope of protection of the present application. For example, the center points of the ROI are not searched, but the first two-dimensional region D1 and the second two-dimensional region D2 are directly outlined.

In some embodiments, the three-dimensional region is a cuboid that may accommodate the first two-dimensional region D1 and the second two-dimensional region D2. Further, when the first two-dimensional region D1 is the smallest rectangular frame that may characterize the ROI in the first visual field, and the second two-dimensional region D2 is the smallest rectangular frame that may characterize the ROI in the second visual field, the three-dimensional region is the smallest cuboid that may characterize the ROI.

Figure 16A:
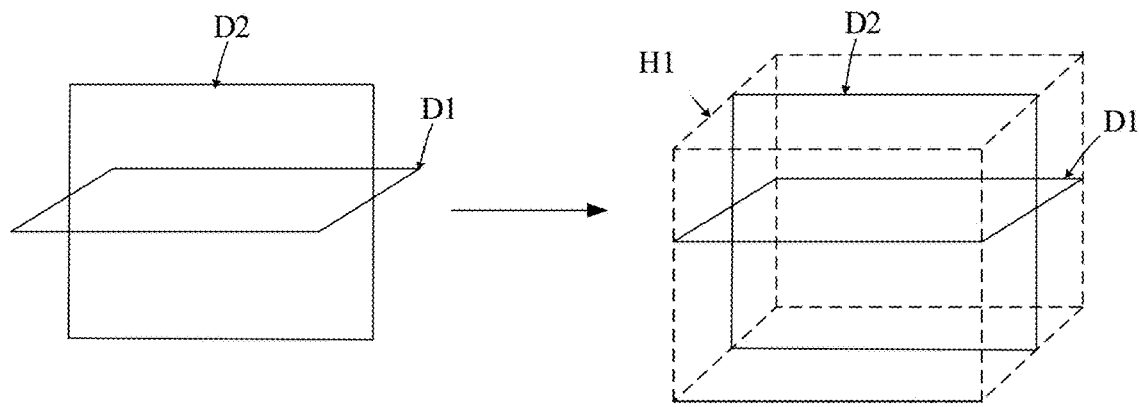
FIG. 16a is a schematic diagram showing a process of fitting a first three-dimensional region based on the first two-dimensional region and the second two-dimensional region according to an embodiment of the present application.

FIG. 16a is a schematic diagram showing a process of fitting a first three-dimensional region based on the first two-dimensional region and the second two-dimensional region according to an embodiment of the present application. As shown in FIG. 16a, since the first visual field and the second visual field are perpendicular to each other, the first two-dimensional region D1 and the second two-dimensional region D2 are also perpendicular to each other. The first two-dimensional region D1 and the second two-dimensional region D2 define a rectangle in the first visual field and the second visual field respectively, and then a cuboid may be fit by taking opposite sides of the second two-dimensional region D2 as a boundary in the first visual field and taking opposite sides of the first two-dimensional region D1 as another boundary in the second visual field, and the cuboid is regarded as the first three-dimensional region H1. The first three-dimensional region H1 is the smallest cuboid that can accommodate the first two-dimensional region D1 and the second two-dimensional region D2.

Figure 16B:
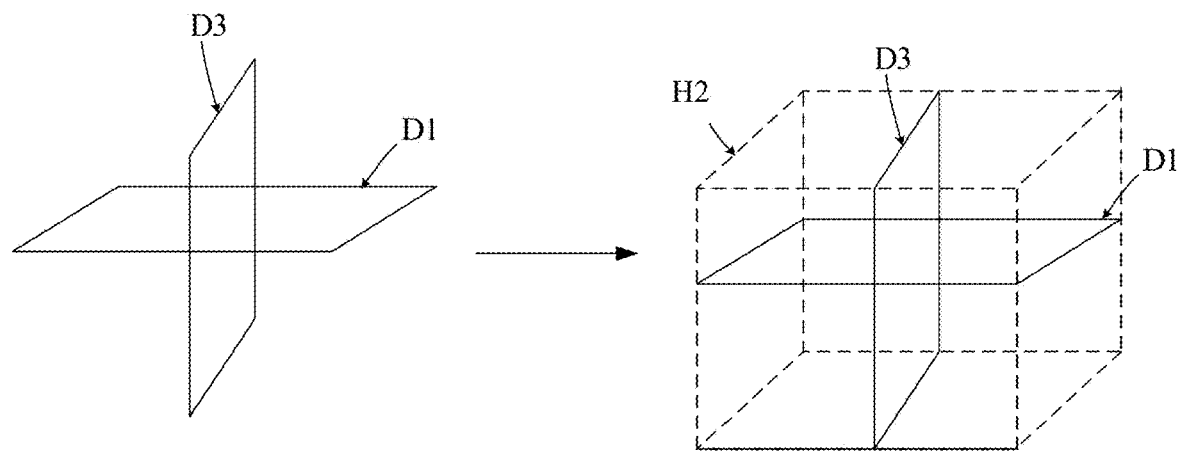
FIG. 16b is a schematic diagram showing a process of fitting a second three-dimensional region based on the first two-dimensional region and a third two-dimensional region according to an embodiment of the present application.

FIG. 16b is a schematic diagram showing a process of fitting a second three-dimensional region based on the first two-dimensional region and a third two-dimensional region according to an embodiment of the present application. As shown in FIG. 16b, as an optional embodiment, in the third visual field, a medical image having a ROI may also be selected, and a third two-dimensional region D3 may be outlined. Since the first visual field and the third visual field are perpendicular to each other, the first two-dimensional region D1 and the third two-dimensional region D3 are also perpendicular to each other. The first two-dimensional region D1 and the third two-dimensional region D3 define a rectangle in the first visual field and the third visual field respectively, and then another cuboid may be fit by taking opposite sides of the third two-dimensional region D3 as a boundary in the second visual field and taking the first two-dimensional region D1 as another boundary in the third visual field, and the other cuboid is regarded as the second three-dimensional region H2. The second three-dimensional region H2 is the smallest cuboid that can accommodate the first two-dimensional region D1 and the third two-dimensional region D2.

Figure 16C:
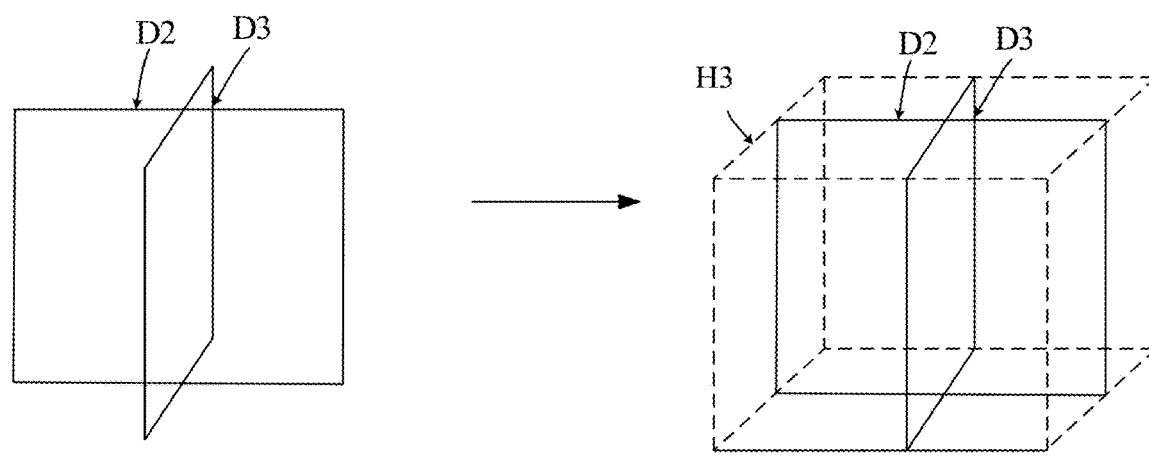
FIG. 16c is a schematic diagram showing a process of fitting a third three-dimensional region based on the second two-dimensional region and the third two-dimensional region according to an embodiment of the present application.

FIG. 16c is a schematic diagram showing a process of fitting a third three-dimensional region based on the second two-dimensional region and the third two-dimensional region according to an embodiment of the present application. As shown in FIG. 16c, as an optional embodiment, in the third visual field, a medical image having a ROI may also be selected, and a third two-dimensional region D3 may be outlined. Since the second visual field and the third visual field are perpendicular to each other, the second two-dimensional region D2 and the third two-dimensional region D3 are also perpendicular to each other. The second two-dimensional region D2 and the third two-dimensional region D3 define a rectangle in the second visual field and the third visual field respectively, and then another cuboid may be fit by taking opposite sides of the third two-dimensional region D3 as a boundary in the second visual field and taking the second two-dimensional region D2 as another boundary in the third visual field, and the other cuboid is regarded as the third three-dimensional region H3. The third three-dimensional region H3 is the smallest cuboid that can accommodate the second two-dimensional region D2 and the third two-dimensional region D3.

In some embodiments, the first two-dimensional region D1, the second two-dimensional region D2, and the third two-dimensional region D3 may be arranged at a preset angle relative to each other, and the preset angle may be determined according to the tissues to be segmented. For example, for the heart image, during a segmentation of heart, the preset angle may be determined according to the bottom surface of heart (norma posterior) and the diaphragmatic surface of heart (norma posterior and inferior). During a segmentation of the pericardial cavity, the preset angle may be determined according to the norma left lateralis and the norma anterior. During a segmentation of the coronary artery, the preset angle may be determined according to a thoracic surface and a diaphragmatic surface, or the oblique norma left anterior and the oblique norma right anterior.

In step S3001, the preprocessed image is input into the trained segmentation model to obtain a segmented image corresponding to the original image. Specifically, the data of the original image, which are in the three-dimensional region, are cut out and input into the trained segmentation model, to segment the object region in the ROI.

Figure 17:
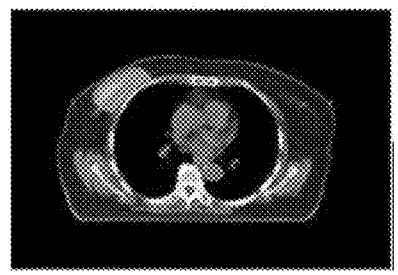
FIG. 17 is a schematic diagram showing an object region in the ROI segmented by a segmentation model according to an embodiment of the present application.

Specifically, the original image is a medical image, the data of the medical image, which are located in the three-dimensional region, are cut out within the boundary of the three-dimensional region, and the cut data of the medical image are input into the trained segmentation model, thereby segmenting the object region in the ROI. FIG. 17 is a schematic diagram showing an object region in the ROI segmented by a segmentation model according to an embodiment of the present application. As shown in FIG. 17, the object region in the ROI segmented by the segmentation model will not exceed the three-dimensional region, thereby avoiding segmentation errors, improving segmentation accuracy, and reducing workload of post modification and correction of the physicists, and avoiding misdiagnosis for patients due to inaccuracy segmentation. Moreover, since the data of the medical image are cut out, the image input into the segmentation model is smaller, which may reduce the segmentation time and the amount of calculation, and improve the segmentation efficiency. In some embodiments, the three-dimensional region is the smallest cuboid that can characterize the ROI, so that the image input to the segmentation model is minimized, thereby reducing the segmentation time and the amount of calculation, and improving the segmentation efficiency.

In some embodiments, the segmentation model may be, for example, the trained neural network model, that is, the target neural network model in the present disclosure. After the cut data of the medical image are input into the segmentation model, the segmentation model may automatically segment the object region in the ROI. The segmentation model may be any of the existing segmentation models, for example, a U-Net model, a Deepmedic model, a V-Net model, a PSPNet model, or a DeepLab model, ect.

In some embodiments, the training samples of the segmentation model are generally natural tomographic image sequences, and generally have rectangular shapes, therefore, if a rectangular ROI is outlined and input into this segmentation model, the segmentation result may be obtained more quickly and accurately, and the probability of segmentation failure and error is smaller.

Further, after the ROI is segmented, the physicist may evaluate the segmentation result of the image, and may feed the feedback information generated after the evaluation to the segmentation model for online learning. It should be understood that since the deep learning model is easily overfitted to the training set, and medical images of different hospitals are often different, therefore the accuracy and the universality of the segmentation model may be enhanced by means of online learning.

After segmenting the ROI, the physicist may perform a post-processing on the segmented image, such as adding, deleting, or modifying the outlined region manually to obtain a final segmentation result, which will not be repeated herein.

Embodiment Sixteen

The embodiment sixteen differs from the embodiment fifteen in that, in the embodiment sixteen, during configuration of the three-dimensional region that characterizes the ROI in the medical image, two medical images where the boundary of the ROI is located are selected in each of three visual fields, and the three-dimensional region is composited by medical images selected in three visual fields.

Figure 18A:
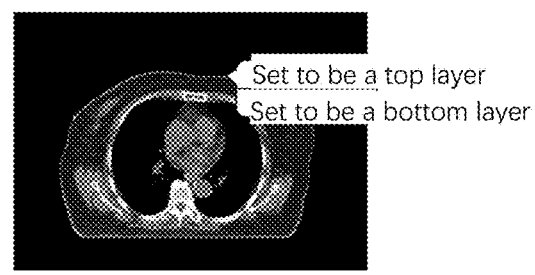
FIG. 18a is a schematic diagram showing two medical images, where a boundary of the ROI is located and which are selected in the first visual field according to an embodiment of the present application.

FIG. 18a is a schematic diagram showing two medical images, where a boundary of the ROI is located and which are selected in the first visual field according to an embodiment of the present application. As shown in FIG. 18a, the physicist examines several medical images in the first visual field, and selects two medical images, where the boundary of the ROI is located, from the several medical images in the first visual field. That is to say, among the several medical images in the first visual field, the two medical images are the medical images where the upper and lower boundary (relative to the human body) of the ROI is located. The selected two medical images in the first visual field are set to be a top layer and a bottom layer respectively.

Figure 18B:
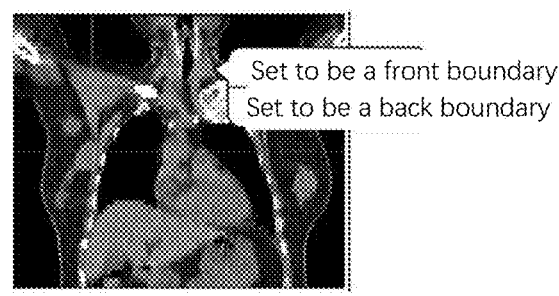
FIG. 18b is a schematic diagram showing two medical images, where a boundary of the ROI is located and which are selected in the second visual field according to an embodiment of the present application.

FIG. 18b is a schematic diagram showing two medical images, where a boundary of the ROI is located and which are selected in the second visual field according to an embodiment of the present application. As shown in FIG. 18b, the physicist examines several medical images in the second visual field, and selects two medical images, where the boundary of the ROI is located, from the several medical images in the second visual field. That is to say, among the several medical images in the second visual field, the two medical images are the medical images where the front and back boundary (relative to the human body) of the ROI is located. The two medical images selected in the second visual field are set to be a front boundary and a back boundary respectively.

Figure 18C:
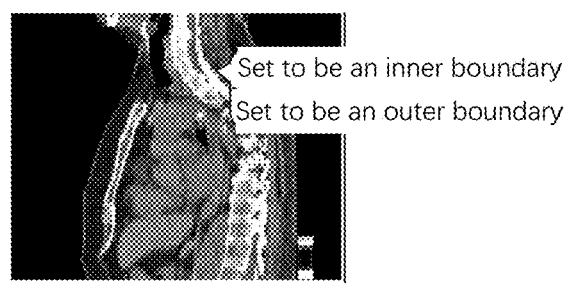
FIG. 18c is a schematic diagram showing two medical images, where a boundary of the ROI is located and which are selected in the third visual field according to an embodiment of the present application.

FIG. 18c is a schematic diagram showing two medical images, where a boundary of the ROI is located and which are selected in the third visual field according to an embodiment of the present application. As shown in FIG. 18c, the physicist examines several medical images in the third visual field, and selects two medical images, where the boundary of the ROI is located, from the several medical images in the third visual field. That is to say, among the several medical images in the third visual field, the two medical images are the medical images where the left and right boundary (relative to the human body) of the ROI is located. The two medical images selected in the third visual field are set to be the inner boundary and the outer boundary respectively.

It should be understood that the selected six medical images may composite a cuboid to serve as the three-dimensional region, and may be equivalent to selected six surfaces of the three-dimensional region, and each surface of the three-dimensional region is part of each of the selected medical images.

In this embodiment, the three-dimensional region is composited by each two medical images selected in each of the three visual fields. Compared with the embodiment one, the physicist does not need to manually outline a rectangular frame, and the workload is smaller and the efficiency is higher.

Embodiment Seventeen

The embodiment seventeen differs from the embodiment fifteen and the embodiment sixteen in that, in the embodiment seventeen, during configuration of the three-dimensional region that characterizes the ROI in the medical image, a closed region characterizing the ROI is selected from the medical image by a tolerance method or an energy field method, and a smallest cuboid capable of accommodating the closed region serves as the three-dimensional region.

Specifically, compared with other regions, the ROI usually has different features, and internal features of the ROI are consistent and are for example, gray scales of the pixels or a contrast ratio of the pixels. Based on this, in this embodiment, when the closed region that characterizes the ROI is selected from the medical image by the tolerance method, the internal features of the ROI are regarded as an integral feature (different from other regions). For example, when the physicist selects a pixel, pixels which are located around and consistent with the selected pixel may be automatically outlined to serve as the closed region.

Further, the structure and the energy of the tissue inside the ROI are different from those in other regions. When the closed region characterizing the ROI is selected from the medical image by means of the energy field method, the ROI serves as an energy field, thereby selecting the closed region characterizing the ROI.

The closed region selected from the medical image by means of the tolerance method or the energy field method is usually an irregular figure. In order to avoid irregularities of the medical image cut out later, in some embodiments, a smallest square frame capable of accommodating the selected ROI is used as the three-dimensional region.

It should be understood that, the above selecting one pixel by the physicist is only one embodiment to provide the feature, and the present application is not limited to selecting one pixel to provide the feature. The physicist may also manually input the feature, which is not described one by one herein.

Compared with the embodiment fourteen and the embodiment fifteen, the embodiment sixteen is more convenient, the workload of the physicist is smaller, and the efficiency is higher.

Embodiment Eighteen

The embodiment eighteen differs from the embodiment fifteen, the embodiment sixteen, and the embodiment seventeen in that, in the embodiment eighteen, during configuration of the three-dimensional region that characterizes the ROI in the medical image, first, a medical image having the ROI is selected in a view, and a two-dimensional region is outlined, then two medical images, where the boundary of the ROI is located, is selected in the view, and boundaries of the two-dimensional region and the selected two medical images define the three-dimensional region.

Specifically, as shown in FIGS. 14a-14c, the physicist examines several medical images in the first visual field, and selects a medical image having the ROI from the several medical images in the first visual field, and outlines the first two-dimensional region D1 in the medical image. As shown in FIG. 18a, the physicist examines several medical images in the first visual field, and selects two medical images, where the boundary of the ROI is located, from the several medical images in the first visual field. The two medical images selected in the first visual field are configured to the top layer and the bottom layer respectively.

Figure 19:
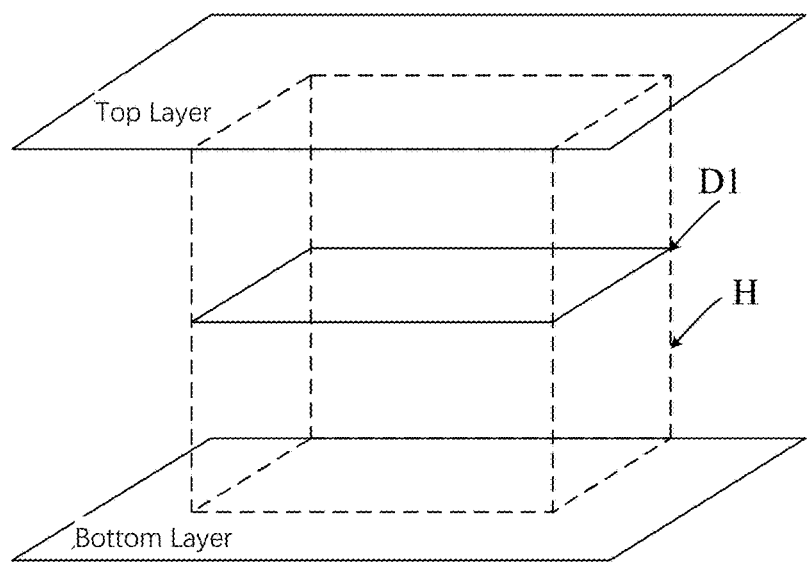
FIG. 19 is a schematic diagram showing a three-dimensional region defined by a boundary of a two-dimensional region and two selected medical images according to an embodiment of the present application.

FIG. 19 is a schematic diagram showing a three-dimensional region defined by a boundary of a two-dimensional region and two selected medical images according to an embodiment of the present application. As shown in FIG. 19, the three-dimensional region is defined by taking the first two-dimensional region D1 as a circumferential boundary, and taking the two medical images (the top and bottom layers in FIG. 19) selected in the first visual field as the upper and lower boundaries.

It should be understood that, as an optional embodiment, the three-dimensional region may also be defined by the second two-dimensional region D2 and two medical images, where the boundary of the ROI is located and which are selected from the several medical images in the second visual field, or defined by the third two-dimensional region D3, and two medical images, where the boundary of the ROI is located and which are selected from the several medical images in the third visual field, which will not be described one by one here.

Embodiment Nineteen

Figure 20:
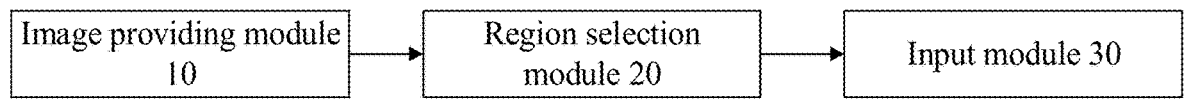
FIG. 20 is a structural block diagram showing an image segmentation system according to an embodiment of the present application.

An embodiment of the present application provides an image segmentation device. FIG. 20 is a structural block diagram showing an image segmentation device according to an embodiment of the present application. As shown in FIG. 20, the image segmentation device includes the following modules.

The image providing module 10 is configured to obtain an original image to be segmented. Specifically, the original image to be segmented is a medical image.

The region selection module 20 is configured to preprocess the original image to be segmented. Specifically, the region selection module 20 is configured to configure a three-dimensional region characterizing the ROI in the medical image.

The input module 30 is configured to input the preprocessed image into a trained segmentation model to obtain a segmentation result corresponding to the original image. Specifically, the input module 30 is configured to cut out data of the medical image in the three-dimensional region and input them into the preset segmentation model, to segment the object region in the ROI.

Furthermore, the embodiment of the present application also provides an electronic device configured to segment an image. The electronic device includes one or more processors, and a memory configured to store one or more programs. When the one or more programs are executed by the one or more processors, the one or more processors implement the image segmentation method provided by the above embodiments.

In some embodiments, one processor and one memory are provided, and the processor and the memory may be connected by a bus or by other means.

The memory, as a computer-readable storage medium, is configured to store software programs, computer-executable programs, and modules, such as program instructions/modules corresponding to the image segmentation method in the embodiment of the present application. The processor executes various functional applications and data processing of the electronic device by running the software programs, instructions, and modules stored in the memory, that is, implements the above image segmentation method.

The memory may mainly include a program storage region and a data storage region. The program storage region may store an operating system and an application program required by at least one function. The data storage region may store data created according to the use of the electronic device. In addition, the memory of the image segmentation method may include a high-speed random-access memory, and may also include a non-volatile memory, such as at least one magnetic disk storage device, a flash memory device, or other non-volatile solid-state storage devices. In some embodiments, the memory may further include memories remotely provided corresponding to the processor, and these remote memories may be connected to an electronic device through a network. Examples of the networks above include but are not limited to the Internet, corporate intranets, local region networks, mobile communication networks, and combinations thereof.

The electronic device provided by the embodiment of the present application and the image segmentation method provided by the above embodiments belong to the same invention concept. For technical details not described in this embodiment, please refer to the above embodiments. This embodiment has the same beneficial effects as the above embodiments.

An embodiment of the present application also provides a computer-readable storage medium, on which a computer program is stored, and when the computer program is executed by the processor, the image segmentation method provided by the above embodiments is implemented.

Through the above description of the embodiments, those skilled in the art may clearly understand that the present application may be implemented by software and necessary general-purpose hardware, alternatively, the present application may also be implemented by hardware, but in many cases, the former is a better embodiment. Based on such understanding, the technical solutions of the present application essentially, or part of the present application that contributes to the prior art, may be implemented in a form of a software product. The computer software product may be stored in a computer-readable storage medium, such as a computer floppy disk, read-only memory (ROM), random access memory (RAM), flash memory (FLASH), hard disk or optical disk, etc., containing several instructions to enable a computer device (which may be a personal computer, a server, or a network device, etc.) to execute the methods described in each embodiment of the present application.

In summary, in the image segmentation method, the image segmentation device, the electronic device, and the computer-readable storage medium provided by the embodiments of the present application, the three-dimensional region characterizing the ROI is first configured in the medical image, and the data of the medical image, which are in the three-dimensional region, are cut out and input into the trained segmentation model, to segment the object region in the ROI. Since it is the cut data of the medical image in the three-dimensional region that are input into the segmentation model, the object region segmented by the segmentation model will not exceed the three-dimensional region, thereby avoiding segmentation errors, improving segmentation accuracy, and reducing workload of post modification and correction of the physicist, and avoiding misdiagnosis for patients due to inaccuracy segmentation. Moreover, the image input into the segmentation model is smaller, which may reduce the segmentation time and the amount of calculation, and improve the segmentation efficiency.

It should be noted that each embodiment in this description is described in a related manner, and the same and similar parts of all embodiments may be referred to each other. The emphasis of each embodiment is focused on the differences from other embodiments. In particular, for the embodiments of the device, the electronic equipment, and the computer-readable storage media, since they are basically similar to the method embodiments, they are described relatively briefly, and the relevant details may be referred to the part of the description of the method embodiments.

What descried above are only preferred embodiments of the present application, but not intended to limit the present application. For any skilled in the art, any equivalent replacement or modification or other changes may be made for the technical solutions and technical content disclosed by the present application without departing from the contents of the technical solutions of the present application, and they still fall within the protection scope of the present application.

What is claimed is:

1. An image segmentation method, comprising:
   obtaining training standard segmented images, and based on an image unit size in at least two dimensions directions of an image unit in each of the training standard segmented images, determining an object dimension direction having a highest degree of anisotropy;
   obtaining positioning information of the image segmentation unit in each of the training standard segmented images in the object dimension direction, and generating training standard contour information based on the positioning information;
   training a segmentation model based on the training standard segmented images and the training standard contour information to obtain a target neural network model;
   obtaining an original image to be segmented;
   preprocessing the original image to be segmented, comprising, by taking each candidate sampling start point as an actual sampling start point, down-sampling the original image to be segmented, and obtaining down-sampled images corresponding to each candidate sampling start point; and
   inputting preprocessed images into the target neural network model to obtain an object segmented image corresponding to the original image.

2. The image segmentation method according to claim 1, wherein:
the standard contour information is configured to characterize positioning information of an image segmentation unit in each of the standard segmented images in at least one dimension direction.

3. The image segmentation method according to claim 2, wherein:
the target neural network model comprises a feature extraction module, an image segmentation module, an intermediate deep supervision module and a terminal deep supervision module;
the feature extraction module is configured to output a feature vector based on each of the input preprocessed images;
the intermediate deep supervision module is configured to output intermediate contour information based on an input feature vector;
the image segmentation module is configured to output the object segmented image corresponding to the original image based on the input feature vector and input intermediate contour information; and
the terminal deep supervision module is configured to output object contour information based on the object segmented image.

4. The image segmentation method according to claim 3, wherein:
the image segmentation module comprises a first image segmentation module and at least one second image segmentation module;
the intermediate contour information comprises first intermediate contour information and second intermediate contour information;
the intermediate deep supervision module comprises a first intermediate deep supervision module and at least one second intermediate deep supervision module, and the first intermediate deep supervision module is configured to output the first intermediate contour information based on the input feature vector;
the first image segmentation module is configured to output a first segmented image based on the input feature vector and the first intermediate contour information;
the second intermediate deep supervision module is configured to output the second intermediate contour information based on the first segmented image; and
the second image segmentation module is configured to output a second segmented image based on the first segmented image and the second intermediate contour information, wherein, the second segmented image comprises the object segmented image.

5. The image segmentation method according to claim 2, wherein:
the standard segmented images comprise training standard segmented images, and the standard contour information comprises training standard contour information; and
the training the segmentation model based on the standard segmented images and the standard contour information to obtain the target neural network model comprises:
obtaining training images in a training set and testing images in a testing set;
inputting the training images into an initial neural network model, and based on the training standard segmented images, the training standard contour information, and training pretested segmented images and training pretested contour information which are output by the initial neural network model, performing an iterative training on the initial neural network model, to obtain at least one intermediate neural network model;
inputting the testing images into each of the at least one intermediate neural network model, and based on an output testing pretested segmented image, determining an evaluation result corresponding to each of the at least one intermediate neural network model;
taking one of the at least one intermediate neural network model, whose evaluation result meets a preset evaluation standard, as the target neural network model.

6. The image segmentation method according to claim 5, wherein the based on the training standard segmented images, the training standard contour information, and the training pretested segmented images and the training pretested contour information which are output by the initial neural network model, performing the iterative training on the initial neural network model, to obtain the at least one intermediate neural network model, comprises:
determining a first loss function based on the training pretested segmented images and the training standard segmented images, and determining a second loss function based on the training pretested contour information and the training standard contour information;
iteratively training the initial neural network model based on the first loss function, the second loss function, and a preset optimizer, to obtain at least one intermediate neural network model.

7. The image segmentation method according to claim 5, wherein, after the preprocessing the original image to be segmented, the image segmentation method further comprises:
dividing the preprocessed images into the training images in the training set and the testing images in the testing set based on a preset ratio; and
performing data enhancement on the training images in the training set, and adding data-enhanced training images into the training set.

8. The image segmentation method according to claim 1, wherein before the inputting preprocessed images into the target neural network model to obtain the object segmented image corresponding to the original image, the image segmentation method further comprises:
obtaining a first preprocessed image, and inputting the first preprocessed image into the target neural network model, to obtain a first pretested result, wherein the target neural network model is obtained through training based on the preprocessed images and a sample set of labelled data;
inputting the first pretested result into a regression model, to obtain an evaluation result for the target neural network model, wherein the regression model is configured to calculate a similarity between a distribution regularity of a first pretested result and a distribution regularity of the labelled data;
determining whether the evaluation result meets a predetermined standard, and if the evaluation result does not meet the predetermined standard, further training the target neural network model.

9. The image segmentation method according to claim 8, further comprising a training process for the regression model, wherein the training process for the regression model comprises:
obtaining a second preprocessed image, and labelling a ROI of the second preprocessed image to obtain a labelled result;

inputting the second preprocessed image into the target neural network model to obtain a second pretested result; and training the regression model by taking the labeled result and the second pretested result as samples.

10. The image segmentation method according to claim 9, wherein the training the regression model by taking the labeled result and the second pretested result as samples, comprises:

obtaining a measurement index based on the labelled result and the second pretested result, wherein the measurement index characterizes a similarity between a distribution regularity of the second pretested result and a distribution regularity of the labelled data; and training the regression model by taking the measurement index and the second pretested result as samples.

11. The image segmentation method according to claim 10, wherein the training the regression model by taking the measurement index and the second pretested result as samples, comprises:

performing a feature extraction on the second pretested result, to obtain a second feature information; and training the regression model based on the second feature information and the measurement index.

12. The image segmentation method according to claim 8, wherein the inputting the first pretested result into the regression model comprises:

performing a feature extraction on the first pretested result to obtain first feature information; and inputting the first feature information into the regression model.

13. The image segmentation method according to claim 1, wherein the inputting preprocessed images into the target neural network model to obtain the object segmented image corresponding to the original image, comprises:

inputting the down-sampled images into the target neural network model, and obtaining segmented region images of regions of interest (ROI) corresponding to the down-sampled images respectively, wherein the target neural network model is a target neural network model;

stitching the segmented region images of the ROI corresponding to each of the down-sampled images to the original image to be segmented, to obtain the object segmented image corresponding to the original image.

14. The image segmentation method according to claim 13, wherein the stitching the segmented region images of the ROI corresponding to each of the down-sampled images to the original image to be segmented, to obtain the object segmented image corresponding to the original image, comprises:

mapping each of the segmented region images of the ROI to the original image to be segmented according to a mapping relationship between each pixel of each of the segmented region images of the ROI and each pixel of the original image to be segmented, to obtain the object segmented image corresponding to the original image.

15. The image segmentation method according to claim 14, wherein the mapping each of the segmented region images of the ROI to the original image to be segmented according to the mapping relationship between each pixel of each of the segmented region images of the ROI and each pixel of the original image to be segmented, to obtain the object segmented image corresponding to the original image, comprises:

mapping each of the segmented region images of the ROI corresponding to each of the down-sampled images to the original image to be segmented based on a conversion formula of:

$$M(x,y)=M^{REM(x/N),REM(y/N)}(INT(x/N)+1,INT(y/N+1)+1)$$

wherein, $M(x, y)$ represents the object segmented image corresponding to the original image, $M^{REM(x/N),REM(y/N)}(INT(x/N)+1, INT(y/N+1)+1)$ represents the segmented region image of the ROI of the down-sampled image corresponding to an actual sampling start point $(REM(x/N),REM(y/N))$, $REM(\ )$ represents a remainder operation, $INT(\ )$ represents a rounding operation, $N$ represents a set sampling step size, and $(x, y)$ represent coordinates of a pixel.

16. An image segmentation method, comprising:

obtaining an original image to be segmented;

determining pixels to be candidate sampling start points, respectively, each of the pixels being located in the original image to be segmented, having a horizontal ordinate greater than 0 and less than or equal to a set sampling step size, and having a longitudinal ordinate greater than 0 and less than or equal to a set sampling step size;

preprocessing the original image to be segmented, comprising, by taking each of the candidate sampling start points as an actual sampling start point, down-sampling the original image to be segmented, and obtaining down-sampled images corresponding to each of the candidate sampling start points; and inputting preprocessed images into a trained segmentation model to obtain an object segmented image corresponding to the original image.

17. An image segmentation method, comprising:

obtaining an original image to be segmented;

preprocessing the original image to be segmented, comprising, by taking each candidate sampling start point as an actual sampling start point, down-sampling the original image to be segmented, and obtaining down-sampled images corresponding to each candidate sampling start point; and inputting preprocessed images into a trained segmentation model to obtain an object segmented image corresponding to the original image;

wherein, by taking each candidate sampling start point as the actual sampling start point, down-sampling the original image to be segmented, and obtaining the down-sampled images corresponding to each candidate sampling start point comprises:

a mapping relationship between each pixel of each of the down-sampled images and each pixel of the original image to be segmented is determined according to a set sampling step size and each candidate sampling start point; and determining the down-sampled images based on the mapping relationship.

* * * * *